United States Patent
Varady et al.

(10) Patent No.: US 10,777,018 B2
(45) Date of Patent: Sep. 15, 2020

(54) SYSTEMS AND METHODS FOR DETERMINING THE SCALE OF HUMAN ANATOMY FROM IMAGES

(71) Applicant: Bespoke, Inc., San Francisco, CA (US)

(72) Inventors: Eric J. Varady, San Francisco, CA (US); Atul Kanaujia, San Francisco, CA (US)

(73) Assignee: Bespoke, Inc., San Francisco, CA (US)

(*) Notice: Subject to any disclaimer, the term of this patent is extended or adjusted under 35 U.S.C. 154(b) by 0 days.

(21) Appl. No.: 15/981,495

(22) Filed: May 16, 2018

(65) Prior Publication Data

US 2018/0336737 A1 Nov. 22, 2018

Related U.S. Application Data

(60) Provisional application No. 62/507,631, filed on May 17, 2017.

(51) Int. Cl.
| | | |
|---|---|---|
| *G06T 19/00* | (2011.01) | |
| *G06T 19/20* | (2011.01) | |
| *G06T 7/80* | (2017.01) | |
| *G06T 3/00* | (2006.01) | |
| *G06T 7/536* | (2017.01) | |

(Continued)

(52) U.S. Cl.
CPC ............ *G06T 19/20* (2013.01); *G06T 3/0068* (2013.01); *G06T 7/50* (2017.01); *G06T 7/536* (2017.01); *G06T 7/62* (2017.01); *G06T 7/74* (2017.01); *G06T 7/80* (2017.01); *G06T 2207/10028* (2013.01); *G06T 2207/30201* (2013.01);

(Continued)

(58) Field of Classification Search
CPC ..... G06T 2210/16; G06T 19/20; G06T 17/00; G06T 19/006; G06T 19/00; G06T 2219/2004; G06T 3/40; G06T 7/80; G02C 7/027

See application file for complete search history.

(56) References Cited

U.S. PATENT DOCUMENTS

| | | | | |
|---|---|---|---|---|
| 6,072,496 A | * | 6/2000 | Guenter | G06K 9/00201 345/419 |
| 6,310,627 B1 | * | 10/2001 | Sakaguchi | A41H 3/007 345/630 |

(Continued)

OTHER PUBLICATIONS

Paul Furgale et al. "Unified Temporal and Spatial Calibration for Multi-Sensor Systems" 2013 IEEE/RSJ International Conference on Intelligent Robots and Systems (IROS) Nov. 3-7, 2013, Tokyo, Japan (7 pages).

(Continued)

*Primary Examiner* — Martin Mushambo
(74) *Attorney, Agent, or Firm* — Bookoff McAndrews, PLLC

(57) ABSTRACT

Systems and methods are disclosed for generating a scaled reconstruction for a consumer product. One method includes receiving digital input comprising a calibration target and an object; defining a three-dimensional coordinate system; positioning the calibration target in the three-dimensional coordinate system; based on the digital input, aligning the object to the calibration target in the three-dimensional coordinate system; and generating a scaled reconstruction of the object based on the alignment of the object to the calibration target in the three-dimensional coordinate system.

20 Claims, 8 Drawing Sheets

(51) Int. Cl.
*G06T 7/73* (2017.01)
*G06T 7/50* (2017.01)
*G06T 7/62* (2017.01)

(52) U.S. Cl.
CPC ............... *G06T 2207/30204* (2013.01); *G06T 2219/2016* (2013.01)

(56) References Cited

U.S. PATENT DOCUMENTS

| | | | | |
|---|---|---|---|---|
| 6,659,609 B2* | 12/2003 | Mothes | G02C 13/005 | 351/204 |
| 6,692,127 B2* | 2/2004 | Abitbol | G02C 13/005 | 351/227 |
| 6,999,073 B1* | 2/2006 | Zwern | G06T 17/005 | 345/420 |
| 7,046,838 B1* | 5/2006 | Sakagawa | G01B 11/25 | 345/419 |
| 8,908,928 B1* | 12/2014 | Hansen | G06K 9/00362 | 382/111 |
| 9,022,565 B2* | 5/2015 | Sauer | A61B 3/111 | 351/204 |
| 9,423,250 B1* | 8/2016 | Troy | G01C 25/005 | |
| 9,759,934 B2* | 9/2017 | Divo | G02C 13/005 | |
| 9,866,820 B1* | 1/2018 | Agrawal | G06K 9/00281 | |
| 10,152,827 B2* | 12/2018 | Luo | G06T 19/20 | |
| 10,222,634 B2* | 3/2019 | Teodorovic | G02C 13/003 | |
| 2002/0070926 A1* | 6/2002 | Kavanagh | G06F 3/0418 | 345/173 |
| 2002/0113756 A1* | 8/2002 | Tuceryan | G02B 27/017 | 345/8 |
| 2003/0123026 A1* | 7/2003 | Abitbol | G02C 13/005 | 351/204 |
| 2003/0231174 A1* | 12/2003 | Matusik | G06T 9/001 | 345/419 |
| 2004/0027456 A1* | 2/2004 | Pierce | H04N 17/002 | 348/175 |
| 2004/0037459 A1* | 2/2004 | Dodge | G06T 17/00 | 382/154 |
| 2004/0218784 A1* | 11/2004 | Nichani | G01V 8/10 | 382/103 |
| 2005/0128196 A1* | 6/2005 | Popescu | G01B 11/25 | 345/420 |
| 2005/0249382 A1* | 11/2005 | Schwab | G06K 9/00778 | 382/115 |
| 2007/0075997 A1* | 4/2007 | Rohaly | G06T 7/80 | 345/419 |
| 2008/0089611 A1* | 4/2008 | McFadyen | G06T 5/006 | 382/289 |
| 2008/0228434 A1* | 9/2008 | Aratani | G06T 7/80 | 702/150 |
| 2009/0122058 A1* | 5/2009 | Tschesnok | G06T 7/564 | 345/420 |
| 2009/0222127 A1* | 9/2009 | Lind | D04B 1/22 | 700/132 |
| 2010/0061622 A1* | 3/2010 | Chang | G06F 17/50 | 382/154 |
| 2011/0010122 A1* | 1/2011 | Ding | G06T 7/85 | 702/95 |
| 2011/0205487 A1* | 8/2011 | Sauer | G02C 13/005 | 351/204 |
| 2011/0242481 A1* | 10/2011 | Wada | G02O 13/005 | 351/204 |
| 2012/0081365 A1* | 4/2012 | Nakagawa | G06F 3/04815 | 345/419 |
| 2012/0183204 A1* | 7/2012 | Aarts | G06T 15/205 | 382/154 |
| 2012/0327124 A1* | 12/2012 | Hatcher | G06F 17/50 | 345/660 |
| 2013/0148851 A1* | 6/2013 | Leung | G06K 9/3241 | 382/103 |
| 2013/0215132 A1* | 8/2013 | Fong | G06F 3/011 | 345/582 |
| 2013/0229482 A1* | 9/2013 | Vilcovsky | H04N 7/144 | 348/14.07 |
| 2013/0314413 A1* | 11/2013 | Coon | A61B 3/111 | 345/420 |
| 2013/0321412 A1* | 12/2013 | Coon | G06T 17/00 | 345/420 |
| 2013/0329957 A1* | 12/2013 | Ebisawa | A61B 3/113 | 382/103 |
| 2014/0002349 A1* | 1/2014 | Hansen | A61B 3/113 | 345/156 |
| 2014/0043328 A1* | 2/2014 | Chen | G06T 17/00 | 345/419 |
| 2014/0118339 A1* | 5/2014 | Davies | G06T 3/60 | 345/419 |
| 2014/0176530 A1* | 6/2014 | Pathre | G06T 19/20 | 345/419 |
| 2014/0225888 A1* | 8/2014 | Bell | G06T 17/00 | 345/419 |
| 2014/0267681 A1* | 9/2014 | Liu | G06T 7/80 | 348/86 |
| 2014/0340374 A1* | 11/2014 | Ukawa | G09G 3/36 | 345/207 |
| 2015/0029180 A1* | 1/2015 | Komatsu | G06T 19/006 | 345/419 |
| 2015/0055085 A1* | 2/2015 | Fonte | B29D 12/02 | 351/178 |
| 2015/0138330 A1* | 5/2015 | Krishnamoorthi | G06T 7/0016 | 348/77 |
| 2015/0185027 A1* | 7/2015 | Kikkeri | G01C 25/00 | 701/533 |
| 2015/0235416 A1* | 8/2015 | Coon | G06T 17/20 | 345/423 |
| 2015/0359459 A1* | 12/2015 | Taylor | A61B 5/1034 | 600/477 |
| 2015/0371443 A1* | 12/2015 | Troy | G06T 19/006 | 345/633 |
| 2016/0078663 A1* | 3/2016 | Sareen | G06T 19/00 | 345/419 |
| 2016/0088284 A1* | 3/2016 | Sareen | G06N 3/006 | 348/47 |
| 2016/0117749 A1* | 4/2016 | Desmarais | A41H 3/007 | 382/111 |
| 2016/0140713 A1* | 5/2016 | Martin | G06T 3/0006 | 382/154 |
| 2016/0163055 A1* | 6/2016 | Li | G06T 15/00 | 345/419 |
| 2016/0189431 A1* | 6/2016 | Ueda | G06T 19/006 | 705/26.8 |
| 2016/0189434 A1* | 6/2016 | Fong | G06T 19/20 | 345/633 |
| 2016/0247017 A1* | 8/2016 | Sareen | G06T 19/00 | |
| 2016/0253839 A1* | 9/2016 | Cole | G06T 17/20 | 345/420 |
| 2016/0261851 A1* | 9/2016 | Tian | G06T 7/80 | |
| 2016/0320476 A1* | 11/2016 | Johnson | G06T 7/80 | |
| 2016/0379419 A1* | 12/2016 | Khalili | G06T 19/20 | 345/419 |
| 2017/0016862 A1* | 1/2017 | Holmes | G01N 29/04 | |
| 2017/0032537 A1* | 2/2017 | Li | H04N 17/002 | |
| 2017/0085860 A1* | 3/2017 | Zhang | H04N 17/002 | |
| 2017/0098125 A1* | 4/2017 | Marty | G06T 7/50 | |
| 2017/0098305 A1* | 4/2017 | Gossow | G06T 3/40 | |
| 2017/0105619 A1* | 4/2017 | Ebisawa | A61B 3/11 | |
| 2017/0140574 A1* | 5/2017 | Sugita | G06T 19/00 | |
| 2017/0161956 A1* | 6/2017 | Fu | G06F 3/147 | |
| 2017/0221226 A1* | 8/2017 | Shen | G06T 7/80 | |
| 2017/0277197 A1* | 9/2017 | Liao | G05D 1/0253 | |
| 2017/0294009 A1* | 10/2017 | Pollard | G06T 7/80 | |
| 2017/0371123 A1* | 12/2017 | Wang | G06T 7/001 | |
| 2018/0005448 A1* | 1/2018 | Choukroun | G06T 19/20 | |
| 2018/0017815 A1* | 1/2018 | Chumbley | G02C 13/003 | |
| 2018/0096537 A1* | 4/2018 | Kornilov | G06T 19/20 | |
| 2018/0300901 A1* | 10/2018 | Wakai | G06T 7/85 | |
| 2018/0343421 A1* | 11/2018 | Kahle | G06T 7/70 | |
| 2018/0364897 A1* | 12/2018 | Takashima | G06F 3/048 | |

(56) References Cited

U.S. PATENT DOCUMENTS

2019/0043269 A1* 2/2019 Lin .................. G06T 17/00
2019/0066734 A1* 2/2019 Kaneko ............ G11B 27/031

OTHER PUBLICATIONS

Gabriel Nützi et al. "Fusion of IMU and Vision for Absolute Scale Estimation in Monocular SLAM" ETH Autonomous Systems Laboratory, 8092, Zurich Switzerland, www.asl.ethz.ch (12 pages).

* cited by examiner

SYSTEMS AND METHODS FOR DETERMINING THE SCALE OF HUMAN ANATOMY FROM IMAGES

RELATED APPLICATIONS

This application claims priority to U.S. Provisional Application No. 62/507,631 filed May 17, 2017, the entire disclosure of which is hereby incorporated by reference in its entirety.

FIELD OF DISCLOSURE

Various embodiments of the present disclosure relate generally to scaling objects based on imaging data. In particular, systems and methods are disclosed for an improved determination of the scale of human anatomy in order to render the anatomy accurately in a virtual try-on environment for a custom product.

INTRODUCTION

Increasingly, consumers are using virtual interfaces for shopping, rather than visiting physical brick-and-mortar stores. One drawback of a virtual shopping experience for apparel is that a user cannot physically try on a product. In such circumstances, a "virtual try-on" technique can help a user review how they look while wearing a product. In order to preview physical good via virtual try-on, a desire exists to determine the scale of the scene in which to superimpose the virtual product. The scaling may permit previewing or rendering the virtual product in a virtual display, with correct scale.

There are numerous methods for determining scale of a user using specific hardware, and each has its own tradeoffs. In an optical store, one method of measuring the size of a user's face is to use a ruler. To measure pupillary distance ($P_d$) of eyes focused at infinity (or, for example, at an object over 20 feet away), an optician, optometrist, ophthalmologist, or other trained user may hold up a ruler and attempt to measure the distance between the eyes. This method is fraught with error. It requires a user to focus not on the person in front of them taking the measurement, but instead on an object past them in the distance. (Otherwise, the convergence of the eyes as the user focuses near will yield an inaccurate measurement.) In addition, since the nose protrudes from the plane of the rest of a user's face, a ruler cannot be placed in the same plane as the eyes. The farther the plane of the ruler is from the plane of the eyes, the more difficult it is to accurately measure $P_d$, and the more error-prone the measurement. It is also difficult to measure monocular $P_d$ using a ruler. Lastly, a user cannot measure herself with a ruler. This method would require another person to measure the user.

Another method used in an optical store is to use a pupilometer to measure binocular or monocular $P_d$. The pupilometer may solve the z-plane issue of a ruler and is much easier to use. However, a pupilometer is an expensive optical tool that, by necessity, requires a user to visit a physical location to have it used on them. Even if a user had his/her own pupilometer, pupilometers entail operation by a person other than the user. Again, a user cannot self-measure.

Stores are beginning to install more sophisticated sensors that aid in the 3D measurement of a face in order to provide a better virtual try-on of inventory not in stock, or to capture additional optical measurements needed to fulfill a progressive lens. The limitations of this approach are the same as that for a pupilometer—this method is expensive, restricted to a limited retail location, and must be operated by a trained professional.

Increasingly, there are numerous methods for measuring the scale of an object using a single picture captured via an image capture device (e.g. charge coupled device (CCD) sensor). In such cases, user may hold an object of known size (e.g., a magnetic stripe card such as a credit card) against his face at a location that is as close to the z-plane of their eyes as possible (e.g., the same distance from the camera as their eyes). The user may also attempt to capture in image in which his/her face is positioned orthogonal to a camera, with the credit card orthogonal to the camera. Determining scale in such scenarios may involve comparing the ratio of the width of the of the card in pixels to the width between the eyes in pixels, then adjusting the scale based on the known width of the card in millimeters to the measured width of the card in pixels. This method may be inexpensive and easy for a user to perform. However, it is also fraught with measurement error.

Scale measurement via a single image can be incorrectly derived due to a number of errors that can be introduced during this setup. A perfect measurement may be achieved if the assumption that the card and face are in the same plane is true. If, however, the card is closer or farther away from the camera than the eyes (or other facial features being measured), the derived scale will be incorrect because the card will appear a different size than it would if it were at the same distance as the item to be measured. In other words, the card may appear larger relative to the face if closer to the camera, which may result in a scale determination of the face that is too small. Conversely, the card may appear smaller relative to the face if it is farther from the camera, which may result in a scale determination that will be too large. An assumption of the difference in z-plane can be made, but any deviation from said assumption will introduce error. Additionally, if the card is not aligned with respect to the face (or eyes, or other features to be measured), then the scale measurement will also be incorrect.

Accordingly, there is compelling need to determine methods and systems to determine scale in a remote fashion via an easy-to-use method that is also substantially more accurate and fault-tolerant than methods and systems disclosed previously.

By extension, a user may wish to have a custom product from a virtual try-on produced as a physical object. Here, accurate scaling is even more crucial because inaccuracies in scale in a virtual try-on may translate into a physical object that is of an unusable or uncomfortable size for a user. While the concept of superimposing a two-dimensional image of a stock item of apparel onto a superficial image of a person exists to give users a general impression of products, current systems are unable to produce virtual custom products in real-world measurements. Accordingly, a desire further exists to convert a virtual product into an actual real-world scale with real-world measurements (e.g., millimeters).

The foregoing general description and the following detailed description are exemplary and explanatory only and are not restrictive of the disclosure.

SUMMARY

One method includes: receiving digital input comprising a calibration target and an object; defining a three-dimensional coordinate system; positioning the calibration target in the three-dimensional coordinate system; based on the digital input, aligning the object to the calibration target in the three-dimensional coordinate system; and generating a scaled reconstruction of the object based on the alignment of the object to the calibration target in the three-dimensional coordinate system.

In accordance with another embodiment, a system for generating a scaled reconstruction for a consumer product: a data storage device storing instructions for generating a scaled reconstruction for a consumer product; and a processor configured for: receiving digital input comprising a calibration target and an object; defining a three-dimensional coordinate system; positioning the calibration target in the three-dimensional coordinate system; based on the digital input, aligning the object to the calibration target in the three-dimensional coordinate system; and generating a scaled reconstruction of the object based on the alignment of the object to the calibration target in the three-dimensional coordinate system.

In accordance with another embodiment, a non-transitory computer readable medium for use on a computer system containing computer-executable programming instructions for performing a method for generating a scaled reconstruction for a consumer product, the method comprising: receiving digital input comprising a calibration target and an object; defining a three-dimensional coordinate system; positioning the calibration target in the three-dimensional coordinate system; based on the digital input, aligning the object to the calibration target in the three-dimensional coordinate system; and generating a scaled reconstruction of the object based on the alignment of the object to the calibration target in the three-dimensional coordinate system.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

DESCRIPTION OF THE EMBODIMENTS

Figure 1:
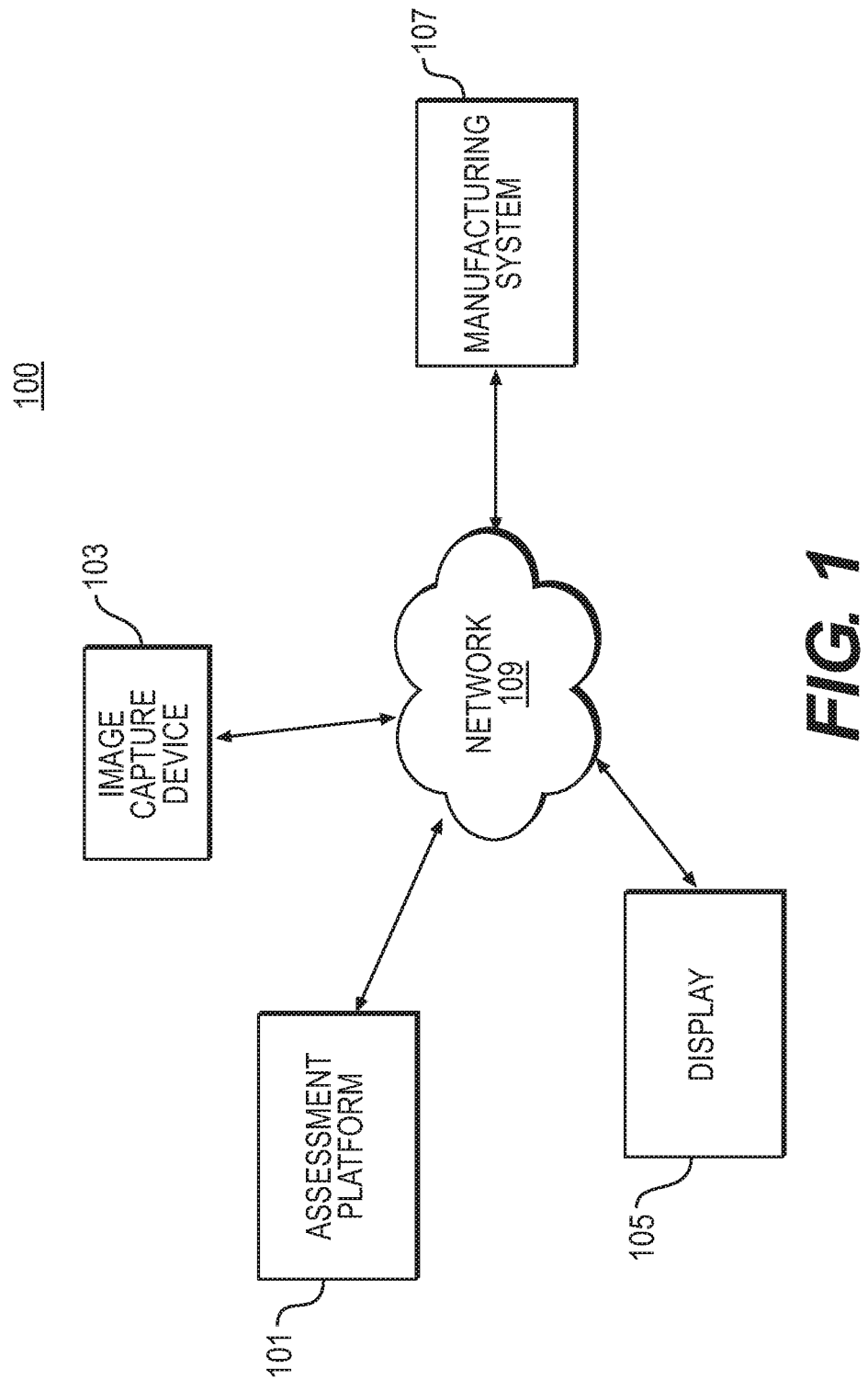
FIG. 1 is a block diagram of an exemplary system and network for scaling a human face in order to produce a custom product, according to an exemplary embodiment of the present disclosure.

Reference will now be made in detail to the exemplary embodiments of the disclosure, examples of which are illustrated in the accompanying drawings. Wherever possible, the same reference numbers will be used throughout the drawings to refer to the same or like parts.

First, embodiments of the present disclosure relate to systems and methods for scaling an object in order to render it accurately in a virtual setting for a virtual try-on. Numerous methods exist for determining scale of a user using specific hardware, and each has its own tradeoffs. Many problems with scale measurement via a simple image sensor stem from the fact that all measurements in pixels are being done in two dimensions (2D). Thus, a compelling need exists for methods and systems for determining scale in a remote fashion and in three dimensions (3D), via an easy-to-use method that is also substantially more accurate and fault-tolerant than methods and systems disclosed previously.

In view of the foregoing, the disclosed systems and methods provide easy-to-use, accurate, and fault-tolerant systems and methods of a scaling mechanism for visualizations (also referred to herein as "virtual try-on" or "try-on"). One exemplary visualization may include generating a preview or a virtual try-on of a consumer product, e.g., an eyewear product. For example, the present disclosure includes exemplary systems and methods for scaling an object of unknown size (e.g., a human face) for generating an accurate rendering during a virtual try-on. Such virtual try-ons may include displays of how the user may look while wearing the eyewear and/or displays of how the user may view objects while looking through the lenses of the eyewear. In one embodiment, the displays may include interactive displays, where the user may further modify geometric, aesthetic, and/or optical aspects of the modeled and displayed eyewear.

In one embodiment, the disclosed systems and methods provide a method of determining a scale using a smartphone or mobile device. In addition, the disclosed systems and methods resolve scaling issues derived from 2D scale computations. The disclosure provides a scale measurement technique that is performed in three dimensions (3D). Several disclosed embodiments are directed to the goal of determining the scale of a human face, though the described methods can be used to determine the scale of other objects.

Next, the disclosed systems and methods further relate to producing a physical custom product with the correct physical scale. Producing a physical custom product with the correct scale may involve determining a scale in one or more images in order to convert a unit-less scale of a virtual product (e.g., a unit-less, scaled custom object in the virtual setting), or a guessed/estimated scale in real-world measurements, into an accurate real-world scale with real-world measurements (e.g. millimeters). The present disclosure includes exemplary systems and methods for generating a physical version of a custom product with the correct physical scale, by scaling an object of unknown size. The present systems and methods may determine parameters for a customized an eyewear product to suit a scaled model of a user's anatomy, based on a determined scale. The present disclosure further includes systems and methods for manufacturing the customized eyewear product.

Regarding generating an accurate scaling, the embodiments herein disclose comparing an object of unknown size to an object of known size. The object of unknown size may be comprised of a user's anatomy (e.g., a user's face). The object of known size may include a calibration target. One embodiment may include determining a scale of the calibration target and using the scale of the calibration target to determine a scale for the object of unknown size. The object of unknown size may then be sized based on that scale.

For example, one embodiment may include receiving a digital input, such as an image, depicting an object of known size and an object of unknown size, reconstructing (or receiving a reconstruction of) the object of known size and reconstructing (or receiving a reconstruction of) the object of unknown size, and aligning the reconstructions in the same coordinate system. Once the reconstructions are aligned in the same coordinate system, the measurements of the reconstruction of the object of known size may be used to scale and measure the reconstruction of the object of unknown size. In this way, the object of unknown size may be sized accurately relative to the object of known size. In other words, an accurately sized, scaled reconstruction of the object of unknown size may be generated. In one embodiment, the reconstructions are three-dimensional ("3D") models. The alignment of the reconstructions may occur in a 3D space approximated by a 3D coordinate system. Exemplary methods for generating the scaled reconstruction are described in detail at FIGS. 1 and 3-5.

Figure 6:
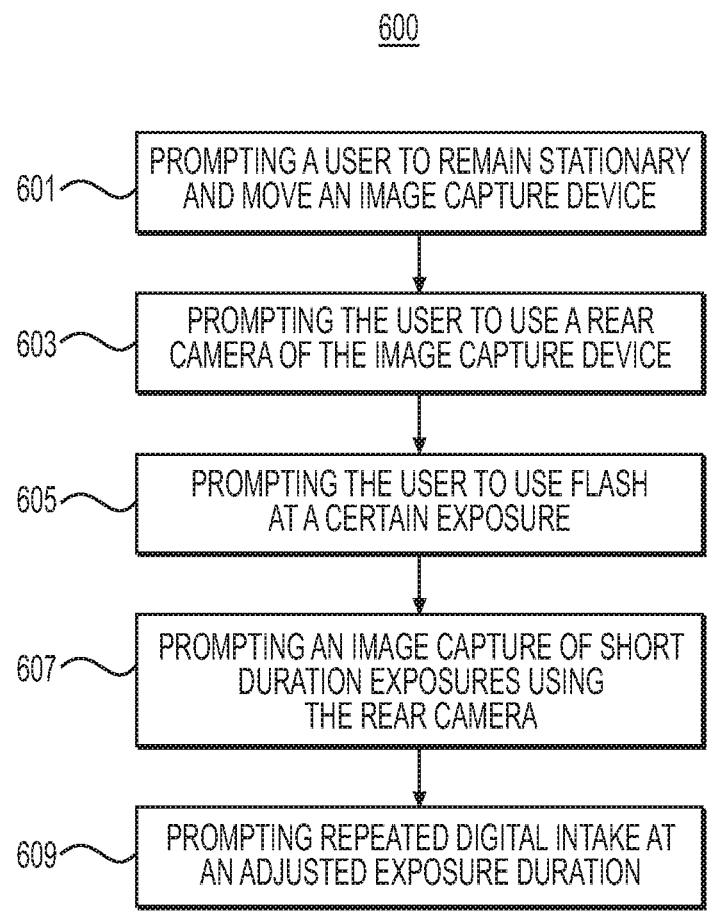
FIG. 6 depicts a flowchart of an exemplary method of generating or capturing digital input to construct a scaled reconstruction, according to an embodiment of the present disclosure.
Figure 7:
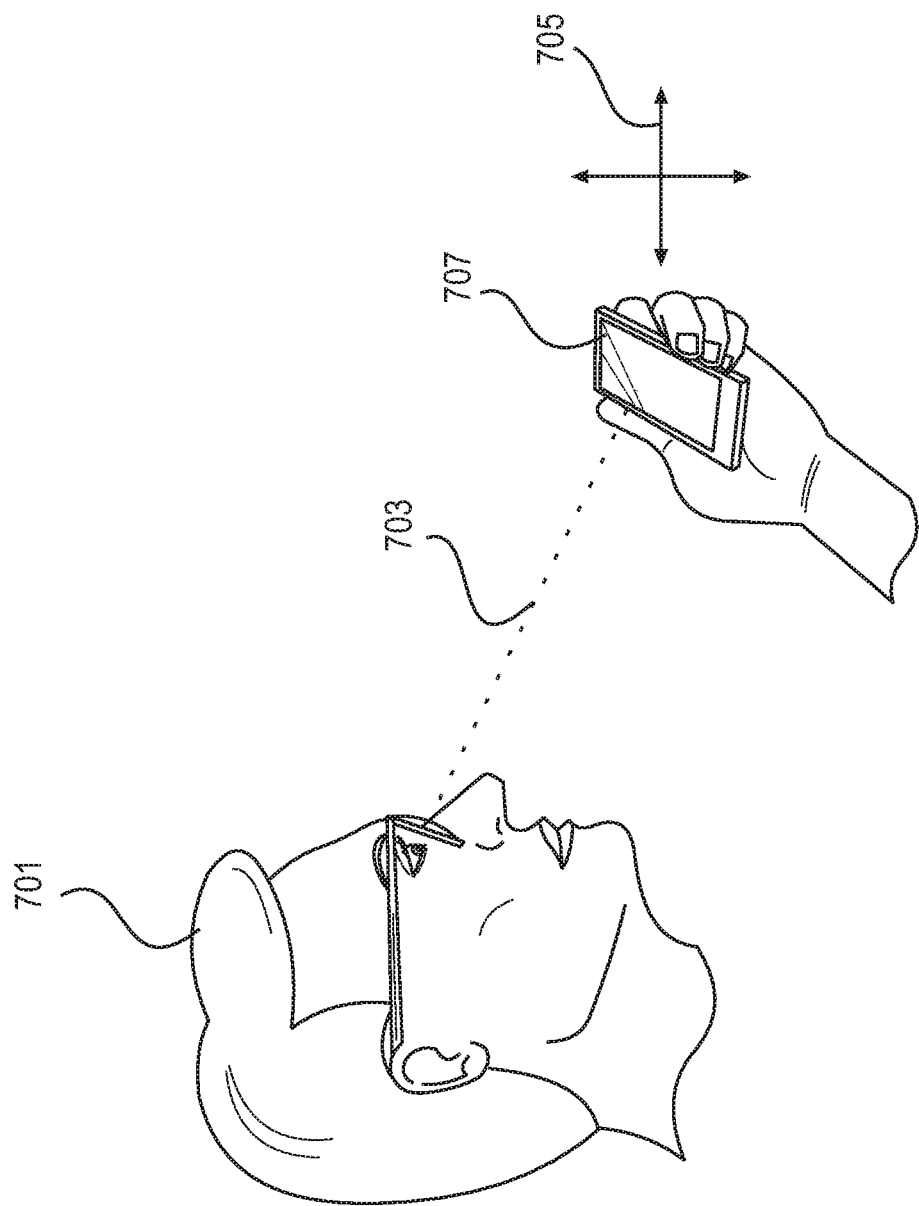
FIG. 7 includes a visual depiction of generating or capturing digital input to construct a scaled reconstruction, according to an embodiment of the present disclosure.

FIGS. 1, 6, and 7 will pertain to an exemplary method of obtaining digital input. In one embodiment, the digital input may be comprised of any data configured for providing the information for a 3D analysis. The digital input may include, for example, a series of images from a singular image sensor taken from different camera positions, a video taken from different camera positions, a series of images or a video taken from different perspectives with depth information included, a 3D point cloud captured from a depth or 3D sensor, a series of images from multiple 2D sensors, a video captured from multiple 2D sensors, etc.

Capturing multiple images and then reconstructing in 3D may have numerous advantages over capturing a singular image or a 2D image. For example, it may allow for the rejection of images that are blurred (e.g., due to motion blur from camera motion, blur from face motion, or out-of-focus blur, or other sources of blur). It can also allow for the rejection of unwanted images due to image artifacts (e.g., compression artifact). It can allow for the rejection of images with unwanted motion (e.g., those in which the user blinked, or opened their mouth, or looked with their face or eyes in an unwanted direction, or performed some other unwanted motion). It may also allow for the rejection of images for which an optimization cannot find agreement as to each image's camera position in 6 degrees of freedom. Further, capturing multiple images can also allow for the assessment, refinement, and rejection of outlier-derived camera positions, e.g., through analysis of the 3D reconstructed models back-projected onto each 2D image.

One embodiment may include generating the virtual try-on and the custom product (manufacturing specifications/instructions) from a single digital capture. For example, a single digital capture may include one video with two different motions—one motion to capture a user's anatomy (as an object of unknown size), and the other motion to scale. A calibration target (if used in a scaling method) may be present only during the portion that is desired or needed to scale the 3D reconstructed object, as opposed to present during the entire capture or longer period.

Another embodiment may include having one dedicated digital capture for scaling, which may be separate from a digital capture for a virtual try-on or for generating the physical custom product. One advantage of a dedicated scale capture is that it need not be a series of images/videos that a user views on a regular basis (e.g., for a virtual try-on). Rather, a dedicated scale capture may be captured once and processed, perhaps with a quick review to ensure that the object of unknown size (and calibration target) is captured in the digital input and instructions were correctly followed, but it may not be the series of images/video that a user would be looking at to make a purchasing decision (for the custom product). An additional advantage of a dedicated scale capture is that it can be delayed until such time that scale should be determined (which for a custom product can be after a design and/or purchasing decision is made and the manufacturing is set to commence). Yet another advantage of a dedicated scale capture is that the processing of said capture need not be real-time, nor calculated as fast as possible. A user can submit a scale capture and it can be processed at a later date/time using an algorithm that may trade faster processing time for improved accuracy. In this way, a user need not wait for processing to be done to continue to the next step in the process. If subsequently it is determined that there is a problem with the scale capture, the user can be notified to re-capture. Said user may be motivated to perform said capture correctly, as he/she is far along in the purchasing process (or has already purchased).

One exemplary method of using a scale capture may include using image data of the scale capture to reconstruct camera motion and reference object motion during the capture. Such an embodiment may include detecting features of an object of unknown size (e.g., a face). For example, one step may include detecting facial landmarks in one or more 2D images of the capture, and using the landmarks to determine an initial camera pose. Another step may include detecting calibration target/reference object landmarks and excluding image regions of the landmarks from detected regions of the face. This step may include determining face-only image regions from the capture. As an example, in one embodiment, if a calibration target is a credit card, landmarks may include a magnetic stripe or one or more corners of the card. Next, the exemplary method may include tracking the detected face-only image regions using low level pixel features to estimate camera poses. The camera pose and face model (based on the face-only image regions) may then be fixed, and the calibration target may be tracked to estimate motion of the calibration target relative to the fixed face pose. Strong locality constraints for the reference object relative to the face may be desired to consistently solve for reference object motion while keeping the camera motion and face model fixed. Understanding the position of the camera and motion of the calibration target may permit a scaling of the face when the calibration target and face are locked or aligned in a 3D space.

While the embodiments of the present disclosure will be described in connection with creating, producing, and delivering custom eyewear, it will be appreciated that the present disclosure involves the creation, production, and delivery of a wide variety of products that may relate to the anatomical or physical characteristics of the user as well as the user's preferences for a particular product. It will be appreciated that describing the disclosed embodiments in terms of the creation, production, and delivery of eyewear carries a large number of similarities to the creation, production, and delivery of a wide variety of products customized to the features and desires of the user. What follows therefore describes the disclosed embodiments in terms of eyewear, it being understood that the disclosure is not so limited.

In one embodiment, the disclosed scaling technique(s) may be performed for a virtual try-on of a stock product, and the scaling may be performed upon manufacturing of a custom product. This may be because the scaling problem is somewhat different for a stock product versus a custom product. When working with a stock product, one may need to know scale before rendering in a virtual try-on display in order to create an accurate rendering because a stock product in a virtual display is a representation of a physical product that is already manufactured with known dimensions. The need for scaling in a virtual try-on display for a custom product may be less crucial because the preview of the product can be based on a unit-less ratio of the size of the product relative to the size of an object in one or more images. That said, accurate scale is crucial to when physically manufacturing a custom product. Without an accurate scale, a resultant custom product may be manufactured with size(s) or dimensions that are unusable or uncomfortable for a user. For example, an inaccurately scaled custom product may produce manufacturing instructions that create a custom product that has correct relative dimensions (e.g., nose-piece relative to earpiece, eyewear shape, etc.), but overall be too small for a user to wear.

The following descriptions are for explanatory purposes to help define the breadth of words used herein. These definitions do not limit the scope of the disclosure, and those skilled in the art will recognize that additional definitions may be applied to each category. By way of definition as used herein, digital input may further include two-dimensional (2D) image(s), digital images, video, series of images, stereoscopic images, three-dimensional (3D) images, images acquired with standard light-sensitive cameras, images acquired by cameras that may have multiple lenses, images acquired by multiple independent cameras, images acquired with depth cameras, images acquired with laser, infrared, or other sensor modalities. Alternately or in addition, depth information may be received or derived from depth sensor(s) independent of image capture (e.g., depth data from a 3D point cloud with no image(s) associated).

In one embodiment, a depth sensor may include a sensor that captures 3D point cloud data and may also create a mesh from said point clouds (absent image capture). In some instances, using depth sensor data alone (e.g., without image capture) may have various limitations. For example, depth data from a depth sensor, alone, may be unable to detect or provide information on the center of a user's pupil. The depth sensor may provide a 3D point cloud data (or a mesh) that corresponds the smooth curvature of the user's eyeball, but since the pupil has no discernible 3D features, depth information alone may fail to provide the location of the user's pupil. Meanwhile, image data (e.g., from an image capture device) may provide a position/location of a user's pupil, e.g., by detecting the contrast difference between the white portion of the user's eyeball and the dark pupil or iris.

Some described exemplary systems and methods may include depth cameras, for instance, cameras that may operate combined depth sensors in conjunction with image sensors to capture a 3D point cloud, form a mesh, and/or apply a texture from the image data (e.g., to correctly paint a physical final eyewear model). Alternately or in addition, the described exemplary systems and methods may include depth cameras that may be combined with depth sensors and image sensors, which may output 2D images. In such images, each pixel may be associated with a depth value (e.g., a distance value from the camera). Outputs from either or both of these exemplary scenarios may be used in the described embodiments.

Various mobile devices (e.g., mobile phones) have (or may have) one or more depth sensors and one or more image sensors, e.g., as independent sensors. In one embodiment, the disclosed systems and methods may detect inputs from each of the two types of sensors (e.g., depth sensors and image sensors) and process the sensor data into data that may be generated by a single integrated "depth camera."

Computer systems may include tablets, phones, desktops, laptops, kiosks, servers, wearable computers, network computers, distributed or parallel computers, or virtual computers. Imaging devices may include single lens cameras, multiple lens cameras, depth cameras, depth sensors, laser cameras, infrared cameras, or digital cameras. Input devices include touchscreens, gesture sensors, keyboards, mice, depth cameras, audio speech recognition, and wearable devices. Displays may include panels, LCDs, projectors, 3D displays, 2D displays, heads-up displays, flexible displays, television, holographic displays, wearable displays, or other display technologies. Previewed images in the form of images, video, or interactive renderings may include images of the user superimposed with product model images, images of the user superimposed with rendering of product model, images of the anatomic and product models of the user, etc. Anatomic models, details, and dimensions may include length of features (e.g., length of nose), distance between features (e.g., distance between ears), angles, surface area of features, volume of features, 2D contours of features (e.g., outline of wrist), 3D models of features (e.g., surface of nose or ear), 3D coordinates, 3D mesh or surface representations, shape estimates or models, curvature measurements, or estimates of skin or hair color definition, and/or estimates of environmental factors (e.g., lighting and surroundings).

A model or reconstruction (of either an object of known size, a calibration target, or an object of unknown size) may include a point-cloud, parametric model, a texture-mapped model, surface or volume mesh, or other collection of points, lines, and geometric elements representing an object. Manufacturing instructions may include step-by-step manufacturing instructions, assembly instructions, ordering specifications, parametric CAD inputs, CAM files, g-code, automated software instructions, coordinates for controlling machinery, templates, images, drawings, material specifications, inspection dimensions or requirements, etc. A manufacturing system may include a computer system configured to deliver manufacturing instructions to users and/or machines, a networked computer system that includes machines configured to follow manufacturing instructions, a series of computer systems and machines that instructions are sequentially passed through, etc. Eyewear may include eyeglass frames, sunglass frames, frames alone, lenses alone, frames and lenses together, prescription eyewear (frames and/or lenses), non-prescription (piano) eyewear (frames and/or lenses), sports eyewear (frames and/or lenses), or electronic or wearable technology eyewear (frames and/or lenses).

Referring now to the figures, FIG. 1 is a block diagram 100 of an exemplary system and network for scaling an object or human anatomy (e.g., a human face) in order to produce a custom product, according to an exemplary embodiment. Assessment platform 101 may be in communication with an image capture device 103, a display 105, and a manufacturing system 107. In one embodiment, assessment platform 101 may be installed on a user's mobile device (e.g., as a mobile app). In another embodiment, a user mobile device may communicate remotely with assessment platform 101. In yet another embodiment, any portion of functions of assessment platform 101 may be performed, at least in part, by a user mobile device and/or other device(s). In one exemplary embodiment, the assessment platform 101 may further comprise server systems that may include storage devices for storing received images and data and/or processing devices for processing received image and data. Image capture device 103 may include, but need not be limited to, a user mobile device, single-lens camera, video camera, multi-lens camera, a multi-camera, IR camera, laser scanner, interferometer, etc., or a combination thereof. The image capture device is henceforth referred to as "camera."

In one embodiment, assessment platform 101 may also be in communication with a display 105. The display 105 may include but is not be limited to a display screen of a user's mobile device, LCD screens, flexible screens, projections, holographic displays, 2D displays, 3D displays, heads-up displays, or other display technologies. The assessment platform 101 may include an input device for controlling the assessment platform 101 including, but not limited to, a touchscreen, keyboard, mouse, track pad, or gesture sensor. The input device may be part of the display 105 and/or communicate with the display 105. The assessment platform 101 may be further configured to provide an interface for a user (e.g., the user or a user similar to or related to the user, an eyewear professional, etc.) to view, customize, browse, and/or order custom products. This interface may be rendered by display 105, which may be either part of, or remote, from the assessment platform 101, in various embodiments.

In one embodiment, assessment platform 101 may be installed on a mobile device comprising image capture device 103. Image capture device 103 may further serve as display 105. In one embodiment, assessment platform 101, image capture device 103, and/or display 105 may communicate to collect digital input of an object of unknown size and/or an object of known size.

In one embodiment, the assessment platform 101 may provide one or more cues or indicators, displays, or prompts for capturing digital input, which may be displayed to a user by display 105, e.g., mobile device comprising image capture device 103. The cues or indicators, displays, or prompts may also be executed separately from display 105, e.g., as an auditory, tactile, or haptic signal. The assessment platform 101 may further include directions for the user to capture digital input, potentially with the aid of visual assessments and prompts. Interactive cues or prompts can be displayed on a screen of display 105, e.g., an interface of image capture device 103. The cues or prompts can also be communicated to the user via programmable audio prompts, simple vibration (with programmable repetition, amplitude, and/or duration), programmable haptic response (haptic/vibration intensity/amplitude waveform), visual via the flash (programmable intensity, repetition, frequency, duration, and color), or visual through other programmable status light indicators on the device. Interactive cues or prompts can also be communicated wirelessly to another device, such as a watch, and the second device can provide said prompts to the user (e.g., where a smartphone wirelessly tells a watch to fire a haptic or audio response).

Interactive cues/prompts can be driven by the following inputs: programmable time (e.g., next prompt after a certain time duration), face detection and pose estimation (e.g., pitch, yaw, roll of face or card) via the imaging sensor, accelerometer data (e.g. device motion changes), gyroscope data (e.g., pitch, yaw, roll, tilt of capture device), and audio inputs via the microphone (e.g. verbal or sound), computer vision face gesture or feature detection (e.g., mouth open/close, blinks, gaze as input, smile or frown, etc.), by similar sensors on a second wearable device (e.g., watch), etc.

The image capture device 103 may then capture and store the digital input. Any combination or division of operations may be distributed between the assessment platform 101, image capture device 103, and/or the display 105. In one embodiment pertaining to scaling or generating custom eyewear, the assessment platform 101, image capture device 103, and/or the display 105 may further be configured to include and/or work with optometry devices or onboard sensors to measure prescription information (e.g., refraction) and automatically incorporate the measurements into the assessment such that no manual entering of prescription data is needed.

In one embodiment, display 105 may further include hardware and/or software configured for generating and displaying virtual try-ons, including visualizations of the customized eyeglass frames or lenses. Exemplary previews may include renderings of the customized eyewear alone, renderings of a user wearing the customized eyewear, and/or previews simulating the user's view though the customized eyewear and/or lenses. The rendering may be overlaid on image data of a user's face, an anatomic model, or as a standalone rendered image of just the frame complete with lenses. In another example, generating a view simulation preview may include rendering a preview of the vision through a custom eyewear model, including the shape, size, and optical properties of a lens. Exemplary previews of this type may include rendering a live or static scene that simulates the user's vision, including but not limited to distortion, area of focus, color, and other optical effects, e.g., how customized lenses may alter a user's vision.

In one scenario, such a preview may include providing an augmented-reality preview (over live video or of a stock image) of the customized lenses to demonstrate the customized changes to the lenses and how they will alter a user's vision (by distorting the live video or stock image as if the user were looking through the lenses). This can serve to not only highlight the benefits of customization, but also to guide a user towards the best symbiotic relationship between frame parameters and lens parameters to achieve a combined system that maximizes the user's style, comfort, and optical/visual acuity. This preview can also highlight the differences between subtle optical changes to lens designs (e.g., differences between progressive lens designs for different activities, lengthening the corridor, adjusting the reading area, etc.). Optical information may be received via a direct transfer of the user's prescription data, received via word recognition of an image/photograph of the user's prescription, and/or derived from other imaging of the user's anatomy. Capturing data for generating user-specific models (e.g., anatomic and parametric models) and generating previews of customized eyewear is described in detail in U.S. Pat. No. 9,304,332 filed Aug. 22, 2014, entitled "Method and System to Create Custom, User-Specific Eyewear," which is incorporated herein by reference in its entirety.

Assessment platform 101, image capture device 103, and display 105 may together capture digital input for a scaled reconstruction. In particular, assessment platform 101, image capture device 103, and display 105 may provide the capability to build and scale 3D models/reconstructions. Building a 3D model from multiple 2D images of differing vantage points (e.g., camera positions) may involve moving a camera(s) (e.g., image capture device 103) relative to a stationary scene, moving object(s) relative to a stationary camera(s), or simultaneously moving camera(s) and object(s). As previously stated, each approach has its advantages and disadvantages.

In one embodiment, an image capture device for the digital input may be comprised of a smartphone. In one scenario, holding a phone in landscape orientation may be ergonomically superior to holding it in portrait orientation if the goal of a digital capture is to have a user hold said phone as far away from his face and/or card as possible (to reduce unwanted wide-angle perspective effects and ensure the face/card remains in-view during entire capture) with limited motion blur. The smartphone may have a front and rear camera. In the disclosed embodiments, either the front or rear camera can be used, each with its own advantages and disadvantages.

Using the front camera may have the advantage of the screen facing the user. This can allow for on-screen instructions, which can provide interactive visual prompts during the scale capture process. Additionally, the screen can also be used to display a full-white (or off-white) image that may take up a portion of the entirety of the screen at a programmable level of brightness in order to serve as a source of illumination to aid the imaging sensor in low-light scenarios or in lighting scenarios where the addition of a specific color spectrum would enhance the white balance or color shift of the scene to be imaged. Further, the screen can also pulse its illumination to provide a prompt or flash quickly in sync with the imaging exposure so it is not illuminated 100% of the time during the capture process nor overheats. If there is a front-facing flash present on the capture device, it too can be used to achieve the same advantages and effects described. Additionally, if there is an infrared source of illumination (IR LED) that is not visible to the user but is visible to the imaging sensor, it too can be used to aid in scene illumination in low light.

On the other hand, the presence of a screen (and any visual prompts) may naturally catch the eye of the user during the capture process, when the intent may be to keep the user's eyes fixed on an object in the distance, not on the phone (which may be close to the user). To mitigate the effects of user eye movement, detection of when the user's gaze shifts from distance to the phone (especially since the phone is moving off-plane or axis with the point in the distance) can be implemented by those familiar in the art of computer vision and gaze tracking. Images of the user of when they are focused not in the distance but instead near at the phone can be discarded, or the images can be used for near pupillary distance measurements (the determination of the distance between the eyes when they converge on a near object, which may be useful in order to order a set of lenses with add power for near distance reading (e.g., reading glasses, bifocal, trifocal, or progressive, etc.)). Another common disadvantage for front cameras of mobile devices is, the front camera may have lower resolution, inferior optics, an inferior sensor, and/or not have optical image stabilization relative to the rear camera.

Use of the rear camera may have its own advantages and disadvantages. The rear camera may be equipped with a higher caliber sensor and/or lens, offering higher resolution, better low-light performance, less noise/graininess, higher maximum ISO (sensitivity), auto-focus pixels, auto-metering (exposure) pixels, auto-focusing optics, and/or optical image stabilization. Newer imaging sensors may also allow the use of pixel binning, which may sacrifice imaging resolution but enhance imaging performance in low light.

Each of these advantages can be used to take higher-resolution and sharper images with less noise, even in low light conditions. Optical image stabilization can also have numerous settings depending on the use case, and can be used to reduce the motion blur induced from the intended and user-directed motion of the camera. Optical image stabilization can also be used to reduce unwanted camera shake. Additionally, the use of a rear facing flash (e.g., visible or infrared) can be used to illuminate the scene in a poorly lit environment as well as shift the color balance.

However, the rear camera has the disadvantage of not readily offering visual feedback of the digital input. When using the rear camera for digital capture, the screen may be facing away from the user. This means that there may not be a screen interface directly accessible to the user as she is collecting/capturing the digital input. That said, a mobile device can interact with a user by employing various methods other than (or In addition) to visual feedback that the face is centered on the screen. Assessment platform 101 may prompt sensors and computation of an image capture device 103 to ensure that an image capture device 103 is held in a correct position in order to capture an appropriate scale input series of images, videos, depth sensor input, etc. Assessment platform 101 may use or prompt use of face detection to ensure that a user's face is centered within an imaging area at the beginning of imaging capture for digital input. Assessment platform 101 may further use or prompt use of a face detection method during capture (e.g., as a real-time analysis) and after capture (e.g., as review data) to ensure that the user's face or calibration target (e.g., a credit card) remained within the imaging field of view during the entire capture process. Assessment platform 101 may further interrogate or prompt use of a gyroscope to ensure the image capture device 103 is in the correct position (within a programmable range) to initiate capture, as well monitoring said gyroscope during capture or analyzing recorded data after capture to ensure the capture process stayed within acceptable parameters. Assessment platform 101 may also use or prompt use of an accelerometer can be used to ensure that image capture device 103 was indeed moved by the user in the prompted direction, and detect during capture if it was moved too fast or vibrated too much that it would result in imaging motion blur. Further, assessment platform 101 may prompt use of a vision sensor to determine the direction of motion of a digital capture via face detection and pose-estimation. The combination of these inputs can be used to create an algorithm that may provide an error-free or fault-tolerant capture process.

Flash (visible, infrared, or from illuminating the screen of the image capture device 103) may also be used to contract the pupils in order to make them higher contrast and easier to detect with computer vision methods (Hough, etc.). Selecting the right color of light can also help in the detection of the edges of the iris a well as the pupil. Moreover, the use of a flash or other source of illumination can also help to detect the corneal reflection (e.g., as in Purkinje images).

The scenario where a user/calibration target moves and the camera remains stationary with the background remaining relatively stable and uniform can have a few advantages and disadvantages. Keeping a camera stationary and moving the object(s) (e.g., face and calibration target) may be suitable for a fixed-position capture sensor in a retail environment (e.g., fixed mount camera), as well as a setup where a user can hold a sensor still while moving his/her face along with a calibration target (e.g., a credit card).

One advantage of a stationary camera is that it results in a uniform background, which can aid with background rejection, since the identification of the user may be the area of the image(s) that is moving/different across frames. An image can be taken before the user is in the scene to fully-capture the entirety of the background (such as in a fixed-mount scenario). Additionally, if playing back the image for the user, it may be more natural and pleasing to view a series of images or video of a stationary background and a moving subject rather than a moving camera. Too much camera movement around a stationary object (and thus a moving background) can be disorientating/unpleasant to view. If brute-force photogrammetry methods are to be used to 3D reconstruct the scene from the 2D images, assessment platform 101 may use a mask in each image (e.g., specific to each image) in order to isolate the subject from the background and then remove the background in order to not confuse such an algorithm (e.g., the subject may be moving relative to the background, which may mean from the perspective of the solved camera positions, the subject is stationary but the background is moving).

Using a mask to isolate a subject from background and remove the background may involve an additional level of complexity that can take longer to process and can introduce errors, especially at the boundaries of the mask. For example, if the mask is too tight, it can crop out useful information of the subject that is necessary to perform subsequent image analysis, 3D reconstruction, or ultimate measurements/scale. If the mask is too loose, it may leave behind portions of the background, the presence of which can confuse the 3D reconstruction algorithm.

One disadvantage of this setup of a stationary camera and moving user is the unintended motions that can be captured. When a user is asked to move, there may be intended (e.g., instructed) motions captured, as well as unintended motions introduced (e.g., twitching, other unwanted facial movements, unwanted eye movement, and undesired relative motion between the face and the calibration target). Furthermore, it may be extremely difficult for a user to keep his eyes focused precisely straight ahead while his face is moving. As a natural reaction, eyes tend to lock focus on an object and track for a short while, then re-position quickly and re-lock focus on a new object. Eye movement may not only introduce blur, but also break any assumptions of a stationary object in a 3D optimization (e.g., motion of a user with a stationary camera can be solved as if the user was stationary and the camera was moving). Asking a user to remain still while moving can introduce undesirable micro-movements of the face (e.g., twitching, nose motion, mouth movement, blinking, etc.). The micro-movements can cause motion blur and 3D optimization disagreement. Also, it is naturally difficult for a user to not have relative movement between his face and a calibration target. Asking a user to move slowly and steadily is often a challenge when they have to hold an object against their face as it is not a natural motion. This natural inability makes any analysis and optimization harder, with a larger number of images needing to be rejected. The more images that agree, the higher the degree of confidence and the better the accuracy of the reconstruction and any derived measurements/scale.

In one embodiment, assessment platform 101 may account for the natural reaction by instructing a user to defocus her eyes (e.g., go cross-eyed). While this method can keep eyes straight ahead while the face is moving, any derived $P_d$ measurement may be affected. Another way to mitigate the disadvantage is to instead track points around the eye. Unlike the pupils/eyes, these points may be unaffected as the user moves her face.

Asking a user/calibration target to remain stationary and instead asking the user to move the camera may have advantages with respect to user experience and compliance with instructions. First, in this scenario, it may be easier for a user to fix his/her eyes on a stationary point/object in the distance and maintain said focus during the entire capture. This may allow for a more accurate capture of stationary pupils focused far away (essentially focused at infinity), which may improve the accuracy of measurements for pupillary distance. In addition, stationary eyes may be a high-contrast circular object, which those familiar in the field of computer vision will recognize as an object that can easily and accurately detected/refined in one or more images using various detector/descriptors such as Scale Invariant Feature Transform (SIFT), Speeded Up Robust Features (SURF), Gradient Localization Oriented Histogram (GLOH), DAISY, Oriented FAST and rotated BRIEF (ORB), Binary Robust Invariant Scalable Keypoints (BRISK), Histogram of Oriented Gradients (HOG), etc.

Secondly, moving the image capture device 103 (e.g., smartphone camera) while keeping the face and calibration target (e.g., a credit card) stationary may also result in a higher likelihood of reduced/eliminated relative motion between the card and the face. This may be true if the card (or other object) is touching the face, as the contact point may serve as an anchor and reduce the normal micro-movements/shaking that humans introduce when attempting to hold an object stationary in space without resting said object against another stationary object. However, if the other stationary object is indeed moving (as is the earlier example of the face and card moving while the camera is fixed), there may be additional unwanted relative motion. In this setup if the face is stationary and the card held in contact with the face yields, the resultant digital capture may be far more stable. As already described, less motion may result in less motion blur, and less challenges with 3D optimization due to reduced/eliminated relative motion between the face and card.

In addition, having a stationary user/calibration target and a moving camera may have advantages with respect to the background; specifically, it may mean the user/calibration target/background are all stationary with respect to the camera. Therefore, there may be a lessened need for a mask for the purposes of performing an accurate 3D reconstruction, and brute-force photogrammetry methods are more suitable to be used. Assessment platform 101 may still use a mask to speed up the processing by isolating the subject and eliminating a large number of pixels (background) that are not material to the problem at hand, but such a mask can be looser fitting so as to not accidentally crop useful area of the subject. However, the viewing of said series of images/video may have a lot of motion of not just the subject, but also the background, and the farther away objects in the background, the more motion/displacement in adjacent frames, which can be unpleasant to view.

Whether asking a user/calibration to move relative to a stationary image capture device or asking a user/calibration target to remain stationary relative to a moving image capture device, the assessment platform 101 may provide a user with prompts, cues, or instructions for capturing digital input. It may be difficult and confusing to tell the user in a succinct and easily-understood manner precisely how slow the system would require they move in order to achieve proper exposure given the lighting conditions. Moving too slow may be difficult for users to comply with, as it is awkward and tiring. It may be easier to tell the user to simply move slowly, and prompt the system to assess the user's movements via its sensor inputs (imaging, accelerometer(s), gyroscope(s), etc.). For example, an image capture device may be prompted to assess, based on sensor input during image/digital input capture, how the user interpreted the instruction to "move slowly" and translated that into an acceleration and velocity.

Assessment platform 101 may further provide a quality analysis of captured digital input, e.g., an image quality analysis. One aspect of receiving digital capture may include detecting whether received digital capture meets a (pre-determined) quality threshold for generating a scaled reconstruction of an object of unknown size. The quality threshold may be pre-determined and dependent on the usage for the scaled reconstruction. For example, if an object of the scaled reconstruction needs only to be a general representation, e.g., a model of a human face for display or illustration, the quality threshold value may be a lower value than a quality threshold value for a scaled reconstruction that will have a functional use, e.g., a model of a human face that will approximate how eyewear actually fits and feels for a particular user.

If captured digital input is acceptable (e.g., meets or exceeds a quality threshold) for generating a scaled reconstruction, assessment platform 101 may generate interactive prompts may communicating a successful capture. If the digital capture is deemed unacceptable (e.g., does not meet the quality threshold), assessment platform 101 may generate interactive prompts that inform a user of unsuccessful capture. Further, assessment platform 101 may provide prompts that iteratively facilitate successful capture. For example, if quality analysis of assessment platform 101 detects that a captured digital input has too much motion blur or graininess to be accepted, assessment platform 101 may automatically request an even slower capture via on-screen, audio, and/or visual prompts and/or pacing. If assessment platform 101 determines that the user moved too slow for captured digital input to be successful, it may be likely the exposure was too short (and hence the ISO setting was too high in order to achieve proper exposure), and graininess/noise may have been introduced in the image(s) as a result. In this scenario, assessment platform 101 may prompt the user to repeat the capture at the same pace as before, but this time prompt image capture device 103 to slow the exposure to achieve a better image capture, with the assumption the motion during the repeat attempt will be the same. By assessing the captured images (and/or leveraging tracking), and/or analyzing the accelerometer and/or gyroscope data, assessment platform 101 may adjust the exposure and ISO of each frame or series of frames in real-time in order to compensate for changes in acceleration and velocity of an object of unknown size (e.g., a user's face) and/or camera introduced by the user as part of the capture process.

In one embodiment, assessment platform 101 may mitigate imaging motion blur using optical image stabilization and/or software image stabilization, both of which can be enhanced through the simultaneous analysis of the accelerometer and gyroscope data. Additionally, assessment platform 101 may configure an imaging sensor (e.g., of image capture device 103) to capture short duration exposures (and adjust the ISO sensitivity to ensure proper exposure). This can ensure motion blur that minimized or eliminated. Assessment platform 101 may also initiate use of a (front or rear) flash to provide an additional source of illumination, which may allow an even shorter duration exposure or a lower ISO setting (to reduce graininess). Motion blur may further be reduced using inertial measurement unit (IMU) sensor data and advanced blur-reduction algorithms that leverage IMU inputs.

Alternately or in addition, assessment platform 101 may provide a pacing guide (e.g., via display 105) to a user. The pacing guide may mitigate motion blur. For example, the pacing guide may provide a fixed pace or frequency, or dynamic based on the needs of the imaging sensor(s) or motion of the user or camera(s). Pacing can be communicated to the user via the feedback mechanisms, such as via audio, vibration, haptic, on-screen, flash, indicator light, or via a secondary device. For example, an audio beat at a specific frequency (e.g., every second) can help slow, steady, and regulate a user's motion. In addition, assessment platform 101 may provide instructions to a user on how many beats or seconds it should take to move from one pre-defined (or pre-communicated) position to another. The assessment platform 101 may prompt use of one or a combination of sensors (imaging, single or multi-axis accelerometer, single or multi-axis gyroscope sensors of image capture device 103) to determine the user's compliance with the instructed speed of motion and adjust the beat accordingly. The speed of motion may also be adjusted based on the lighting conditions of the scene. For example, in low light, in order to achieve an acceptable exposure without excessive image graininess, noise, or other unwanted artifacts due to a compensating high ISO setting, it may be preferable for the motion of the user or of the imaging apparatus to be slowed. Providing a slower beat to the user can help the user achieve the necessary motion the system requires to capture digital input of sufficient quality to generate a scaled reconstruction.

The assessment platform 101 may further control the abilities of imaging sensors (e.g., of imaging device 103) on a collective level. For example, many imaging sensors also have the ability to leverage the entire sensor or a cropped portion thereof. For example, a 4:3 aspect sensor may have the ability to capture an image or video at a landscape 16:9 aspect ratio, and it may do so by ignoring those pixels that would be above and below the 16:9 rectangle that would be formed by centering and maximizing said rectangle inside the sensor's 4:3 rectangle outline. This may mean the field of view would be minimized. However, when recording a scale video or series of images, it may be advantageous to record the maximum field of view so as to not discard imaging data that may be valuable. For example, the larger the field of view recorded, the less likely it is for a user to inadvertently move out of view (especially if using the rear camera, with the display pointing away). The assessment platform 101 may direct sensors to adjust or maintain a field of view. Alternately or in addition, assessment platform 101 may decide whether or not to lock or allow to automatically adjust any of the following variables during capture: exposure, ISO, white balance, focus, optical image stabilization, software image stabilization, resolution, pixel binning, frame rate.

In one embodiment, performance and accuracy of landmark detection of the object of unknown size (e.g., a user's face) and calibration target (e.g., a credit card) across adjacent images or video frames can be improved by leveraging tracking methods. This can be applied to the scenario in which the face/card moves and the camera(s) may be stationary, in the scenario in which the face/card is stationary and the camera(s) moves, or in the situation where all objects/camera(s) (or a subset of these) are moving. Tracking can be further improved by analyzing simultaneously recorded and synchronized accelerometer and gyroscope data. Assessment platform 101 may employ tracking methods to predict where landmarks correctly detected in one image are likely to appear in an adjacent image, based on an understanding of prior motion (as assessed in prior image pairs) as well as from analyzing accelerometer and gyroscope data. Such prediction can improve processing speed and accuracy because only a small portion of the next image needs to be searched for each landmark, rather than the entire image. Accordingly, assessment platform 101 may employ analytics to offer predictive capabilities for landmark detections of an object of unknown size and calibration target.

In one embodiment, assessment platform 101 may scale an object of unknown size using an analysis of synchronized image data, accelerometer data, and gyroscope data (or any input data known to those in the field as sensor fusion). In some cases, assessment platform 101 may perform his scaling without a calibration target. By leveraging known camera (or cameras) intrinsic parameters, comparing the motion of detected landmarks across frames as the subject or camera moves, and analyzing the synchronized accelerometer and gyroscope data, assessment platform 101 may simultaneously solve for the camera distance from the subject and the size and scale of the detected object or features within the images.

Alternately or in addition, assessment platform 101 may work with depth sensors or multi-camera sensors. Doing so may speed up processing and increase accuracy. Depending on the type of depth sensor used, some may provide depth in units of known scale, while others may give results in unknown scale. Regardless of the type of depth sensor used, depth information provided will vastly speed up processing time, increase accuracy, lessen the number of images needed, and simplify the user experience.

In one embodiment, assessment platform 101 may receive intrinsic camera parameters that may be solved for prior to a digital capture, in a calibrated environment. However, due to the manufacturing tolerances inherent in any mass-manufactured image sensor and due to the short focal lengths common among imaging sensors in mobile devices, there can be a variation in camera intrinsics across the same make and model of imaging sensors in user's possession. The methods described herein can be used to not only scale the measurements of a user (or any object) due to the presence of an object of known size (e.g., a calibration target), they can also be used to simultaneously calibrate and solve for the camera intrinsic parameters of each imaging sensor used.

In summary, assessment platform 101 may analyze multiple images and solve in 3D. In doing so, the disclosed systems and methods may enable sub-pixel accuracy not achievable from 2D scaling. Further, the present systems and methods may yield and determine measurements with a confidence and level of precision beyond what a single image can yield, due to the resolution or optical limitations of sensors. Leveraging multiple images, especially from slightly different perspectives, can exceed these limitations.

The assessment platform 101 may be configured to connect to a network 109 or other systems for communicating and transferring data. In one embodiment, network 109 may provide communication between one or more image capture devices, displays, and/or input devices, and the assessment platform 101. For example, network 109 may be a bus and/or other hardware connecting one or more of components and modules of one or more image capture devices, displays, and/or input devices, and the assessment platform 101. Alternately or in addition, the assessment platform 101 may be configured to include the image capture device 103, one or more other image capture devices, the display 105, one or more other displays, input devices, and/or a combination thereof. The assessment platform 101 may include or be in communication with any combination of image capture devices, displays, input devices, or other computer system(s). In some embodiments, a user or an eyewear professional may be in communication with or inputting data into assessment platform 101. Such data may include user anatomy and/or viewing habits.

The disclosed systems and methods further describe scaling a virtual model of a human face in order to produce a physical, tangible custom product with the correct physical scale. In one embodiment, manufacturing system 107 may receive a customized eyewear model (e.g., including parameters for ordering customized eyewear (frames and/or lenses) and user information e.g., via a network 109 or other form of electronic communication. The manufacturing system 107 may then produce a physical version of the customized product based on the modeled customized eyewear and/or prompt the delivery of the customized product to the user. In one embodiment, manufacturing system 107 may receive manufacturing instructions (e.g., from assessment platform 101), the manufacturing instructions may be based on a reconstruction of an object, scaled using the methods disclosed herein. Manufacturing system 107 may also translate a scaled reconstruction of an object into manufacturing instructions. In one embodiment, the manufacturing system 107 may produce a physical customized eyewear product based on a scaled model of a customized eyewear product and/or prompt the delivery of the customized product to the user. Manufacturing customized eyewear is described in detail in U.S. Pat. No. 9,304,332 filed Aug. 22, 2014, entitled "Method and System to Create Custom, User-Specific Eyewear," which is incorporated herein by reference in its entirety.

In one embodiment where a single mobile device operates the assessment platform 101, an image capture capability, and a display capability, the assessment platform 101, image capture device 103, and/or display 105 may communicate via a processor in a single user's mobile device. Alternately or in addition the assessment platform 101, image capture device 103, and/or display 105, and/or the manufacturing system 107 may communicate via network 109. In one embodiment, network 109 may include the Internet, providing communication through one or more computers, servers, and/or handheld mobile devices, including the various components of system 100. For example, network 109 may provide a data transfer connection between the various components, permitting transfer of data including, e.g., a user's information, optical measurement information, anatomic information, customized parametric model, aesthetic preferences for eyewear, prescription, etc. Alternatively or in addition, network 109 may be a bus and/or other hardware connecting one or more of components and modules of mobile device 601, device(s), image capture device(s) 605, the assessment module 607, preview device 609, and/or the manufacturing system 611.

The assessment platform 101 may be configured to connect (e.g., via network 109) to other computer system(s), including but not limited to servers, remote computers, etc. The other computer system(s) may be connected to or in control of the manufacturing system 107. In one embodiment, manufacturing system 107 may receive manufacturing instructions (e.g., from assessment platform 101). For example, models of customized eyewear determined by assessment platform 101 may be converted into manufacturing specifications (e.g., either by the assessment platform 101, manufacturing system 107, or a combination thereof).

Figure 2A:
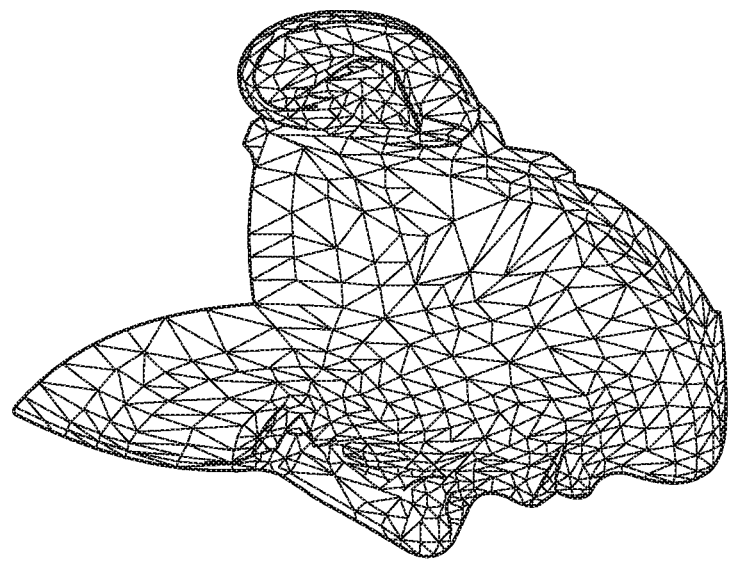
FIG. 2A depicts an exemplary anatomic model, according to an embodiment of the present disclosure.
Figure 2A:
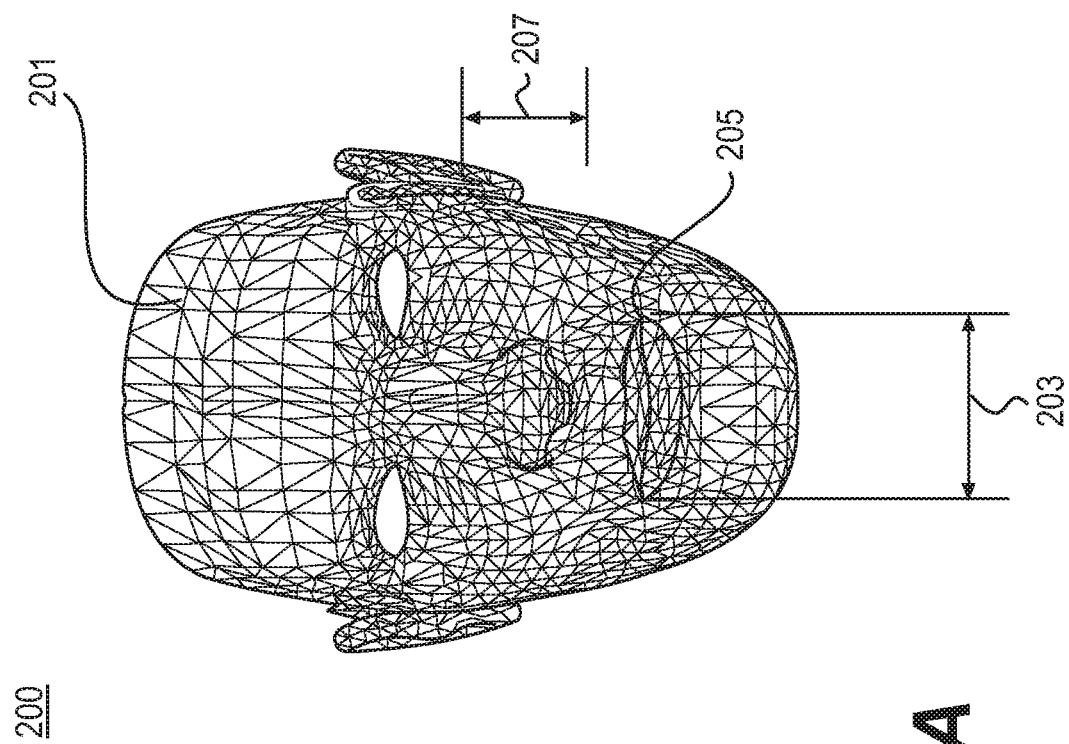

FIG. 2A depicts an exemplary scaled anatomic model 200, according to an embodiment of the present disclosure. In one embodiment, assessment platform 101 may receive an anatomic model of a user, who may upload, input, and/or transfer his or her anatomic data to assessment platform 101 via digital input. For example, a user may transfer one or more images and/or a video of his/her facial features to the assessment platform 101, e.g., from another computer system or an image capture device. In some scenarios, the assessment platform 101 may further receive measurement input by a user, e.g., the assessment platform 101 may provide a display including one or more prompts or instructions, guiding a user to submit various forms of anatomic data. In an exemplary embodiment, the assessment platform 101 may generate an anatomic model of the user based on the digital input and/or measurement data of the user's anatomy.

Scaled anatomic model 200 may be comprised of a mesh 201. The resolution of the mesh 201 may be altered based on curvature, location, and/or features on the user's face, etc. For example, mesh 201 around the eyes and nose may be higher resolution than mesh 201 at the top of the head. In an exemplary embodiment, the anatomic model 200 may include the front and side face area, though in other embodiments, the anatomic model 200 may model the entire head, while including more detail at the modeled eyes and nose. Alternative representations may include point clouds, distance maps, image volumes, or vectors.

In one embodiment, local facial deformation can occur as a user's expression changes during capture of digital input. This may be due to user smiling or talking during the capture. The exemplary systems and methods disclosed herein may anticipate and account for local facial deformation during capture of digital input and robustly reconstruct a 3D face by tracking these facial deformations and non-rigidly morphing a reconstructed 3D face mesh to align with the image data of the digital input. The non-rigid deformation to align with a subject's face may be performed independent of a learned 3D shape space model (e.g., of a the subject's face), and need not be constrained by it. Effectively, this means that facial deformations need not be modeled by the 3D shape space model and can be handled by the disclosed systems and methods. In this way, the assessment platform 101 may produce accurate scaling despite any facial deformation not seen by the pre-trained (or learned) 3D shape space model. In some cases, the same process of non-rigid 3D face mesh deformation may be performed both for a selfie (e.g., a first image data input that permits 3D reconstruction of a user's face) and a scale video capture (e.g., a second image data input (e.g., a video) with an object of known size). The 3D face mesh and reconstructed 3D object may then be used to produce the scaled anatomic model 200.

In an exemplary embodiment, a generalized quantitative anatomic model may be distorted to fit the user's face, e.g., based on anatomic data input by the user. The model 200 may be parameterized and represented as a mesh, with various mesh points affected by adjusting parameters. For example, mesh 201 may include various mesh elements, such that one parameter may constrain or influence another parameter. For example, a parameter (e.g., user expression) may influence the length 203 of mouth feature 205, the height of cheek feature 207, and by extension, the portion of lenses of a custom eyewear product that a user may be looking through. In this example, if the parameter influencing length 203 were adjusted, then the appropriate elements of the mouth 205 and cheek feature 207 (and lens portion) would adjust coordinates in order to match the parameter specified. Other models, e.g., a shape model, may have generalized parameters like principal components that do not correspond to particular features but allow the generalized anatomic model to be adapted to a plurality of different face sizes and shapes.

In one embodiment, a computer system (e.g., assessment platform 101) may analyze received digital input/image data to iteratively perform a sequence of feature detection, pose estimation, alignment, and model parameter adjustment. A face detection and pose estimation algorithm may be used to determine a general position and direction the face is pointing toward, which may aid in model position and alignment. Machine learning methods may be used to train a classifier for detecting a face as well as determining the pose of the head in an image that is post-processed to define various features, including but not limited to Haar-Like or Local Binary. Training datasets may include of images of faces in various poses that are annotated with the location of the face and direction of pose, and also include specific facial features. The output may include a location of the face in an image and a vector of the direction of head orientation, or pose.

The assessment platform 101 may further receive or detect the 3D position and 3D angle and/or 3D orientation (e.g., rotation, tilt, roll, yaw, pitch, etc.) of an imaging device relative to the user, while capturing the received image data. In one embodiment, the position and/or orientation of the imaging device may be transmitted to the assessment platform 101, e.g., as part of the image data. In another embodiment, the position and/or orientation of the imaging device may be detected from the image data.

In one embodiment, the assessment platform 101 may iteratively define more detailed facial features relevant to eyewear placement and general face geometry, e.g., eye location, pupil and/or iris location, nose location and shape, ear location, top of ear location, mouth corner location, chin location, face edges, etc. Machine learning may be used to analyze the image to detect facial features and edges. In one embodiment, the generalized quantitative anatomic model parameters may be aligned and adjusted to the detected/located facial features, minimizing the error between the detected feature location and the mesh. Additional optimization of the generalized quantitative anatomic model may be performed to enhance the local refinement of the model using the texture information in the image.

In an exemplary embodiment, the generalized quantitative anatomic model may include parameters that influence features including but not limited to eye location, eye size, face width, cheekbone structure, ear location, ear size, brow size, brow position, nose location, nose width and length and curvature, feminine/masculine shapes, age, etc. An estimation of the error between the detected features and model may be used to quantify convergence of the optimization. Small changes between adjacent images in a dataset (e.g., from video image data) may be used to refine pose estimation and alignment of the model with the image data. The process may iterate to subsequent image frames.

Those skilled in the art will recognize there are many ways to construct and represent quantitative information from a set of image data. In another embodiment, a user quantitative anatomic model may be generated without a generalized anatomic model. For example, the assessment platform 101 may use structure from motion (SFM) photogrammetry to directly build a quantitative anatomic model.

The features detected in multiple images, and the relative distances between the features from image-to-image may be used to construct a 3D representation. A method that combines a generalized shape model with subsequent local SFM refinement may be utilized to enhance local detail of features, e.g., a user's nose shape.

In another embodiment, user quantitative anatomic model may include a point cloud of key features that are detected. For example, the assessment platform 101 may detect and track facial landmarks/features through one or more images. Exemplary facial landmarks/features may include the center of the eyes, corners of the eyes, tip of the nose, top of the ears, etc. These simple points, oriented in space in a dataset, may provide quantitative information for subsequent analyses. The point cloud quantitative information may be obtained using the methods previously mentioned, or with other methods, e.g., active appearance models or active shape models.

Technologies including depth cameras or laser sensors may be used to acquire the image data, and directly produce 3D models (e.g., a 3D scanner), by their ability to detect distance. Additionally, the use of out of focus areas or the parallax between adjacent images may be used to estimate depth. Additionally, data acquired via a depth sensor may be combined with images/image data captured from an image sensor, and the two datasets may be combined via the methods described herein in order to refine and achieve a higher-accuracy face mesh and/or camera positions/orientations.

Alternatively, the user quantitative anatomic model and dimensions may be derived from a pre-existing model of the user's face. Models may be acquired from 3D scanning systems or imaging devices. The assessment platform 101 may receive user anatomic models via digital transfer from the user, e.g., by non-transitory computer readable media, a network connection, or other means.

Figure 2B:
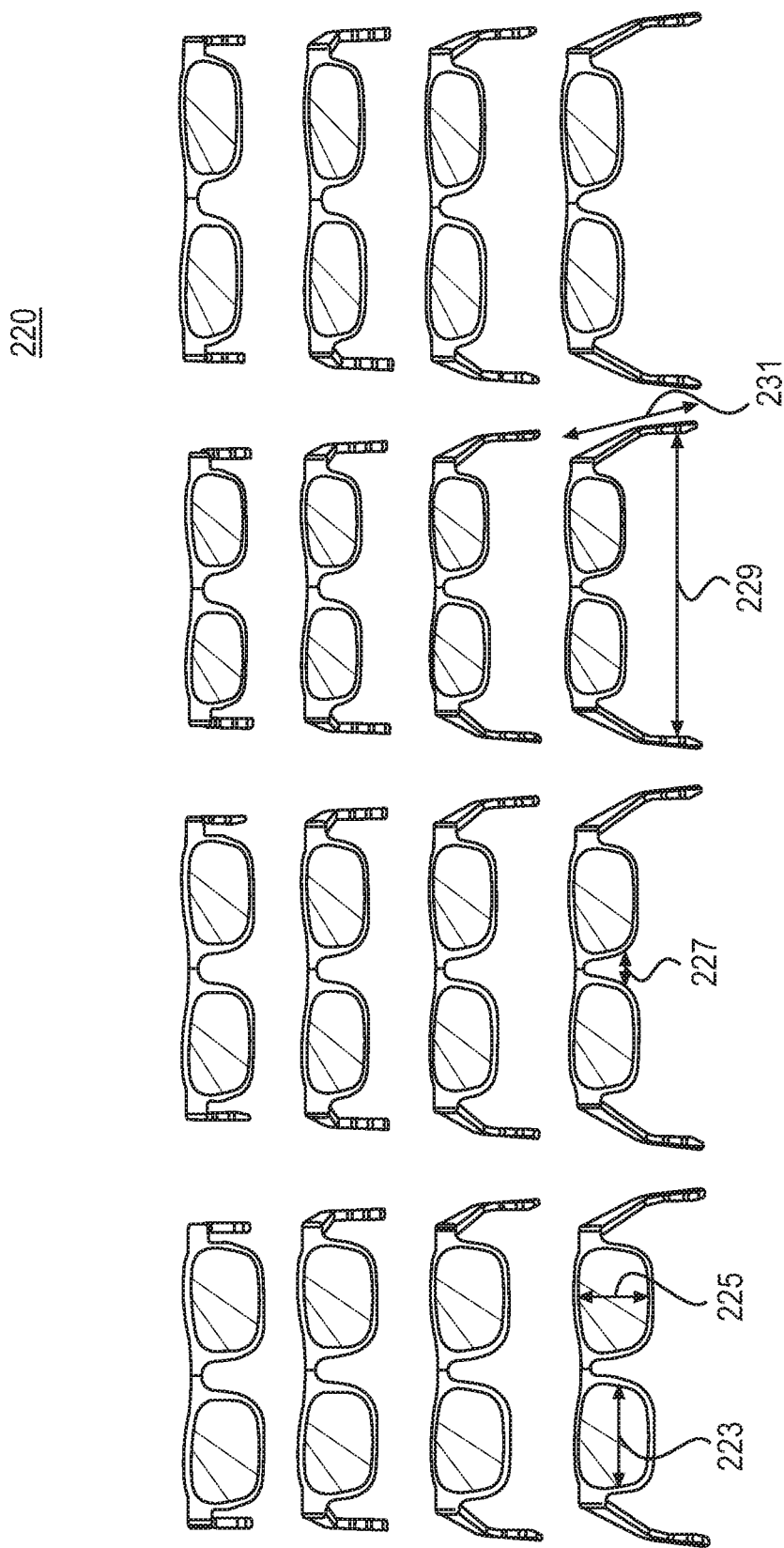
FIG. 2B depicts an exemplary parametric model of a user-specific eyewear product, according to an embodiment of the present disclosure.

FIG. 2B depicts an exemplary parametric model 220 of a user-specific custom eyewear product, according to an embodiment of the present disclosure. Assessment platform 101 may obtain or generate at least one parametric model of a user-specific eyewear product including a frame portion and a lens portion. Assessment platform 101 may further transform the parametric model of the user-specific eyewear product into real-world dimensions, based on a scaled anatomic model.

FIG. 2B includes various examples of configurations and shapes that may be achieved by changing one or more of parameters of the parametric model 220. The parametric model 220 may include a representation of the eyewear product that may be modified to alter properties, including shape, size, color, finish, etc. The parametric model 220 may be adapted to a variety of shapes, sizes, and configurations to fit a diversity of face shapes and sizes. For example, nose pads of an initial parametric model of the eyewear product may not match the contour of the user's nose (e.g., from a user anatomic model). The initial parametric model may instead intersect with the surface of the nose if the initial parametric model is aligned with or overlaid over the user anatomic model. The assessment platform 101 may configure or modify the initial parametric model such that the nose pads match the contour and angle of the user's nose from the user anatomic model, e.g., the nose pads are modified to sit flush against the surface of the modeled user's nose. In some embodiments, parametric model 220 may be generated directly from user anatomic data, without obtaining an initial (e.g., generic) parametric model and modifying the initial model based on the user anatomic data. For example, parametric model 220 may be generated with a provided 3D model of the user's face/anatomic measurements of the user's face, with a 3D mesh or point cloud (e.g., from a depth sensor), and/or another method where a parametric model may be generated without modifying a pre-existing one.

In some embodiments, the parametric model 220 may enable adjustment of at least one parameter, while allowing constraints to be enforced on other parameters so the model may be locally adapted, for example, by adjusting the width and angle of the nose pads on the customized eyewear product without changing anything else about the eyewear product. FIG. 2B shows exemplary parametric model 220 configured to 16 variations. The exemplary configurations depict variations of eyewear lens width 223, lens height 225, nose bridge width 227, the distance 229 between the temples where the earpieces of the frame may contact a user's ears, the distance 231 from the front of the frame to the user's ears, and other minor dimensions. In the illustrated embodiment, the material thickness and hinge size and location may remain unchanged. The parametric configuration may enable the eyewear design to be highly configurable while remaining manufacturable. For example, a manufacturer may use one hinge design and a single selected material thickness for all these designs and more, yet still allow massive customization of the underlying shape and size.

The parametric model 220 may include constraints that prevent certain parts/regions from being altered into a design that is no longer optimal to manufacture. For example, the minimum thickness of parts may be limited to ensure structural strength, and the minimum thickness around the lenses may be limited to ensure the lenses can be assembled into the eyewear without the eyewear breaking or the lenses not being secure within the frame. Furthermore, the hinge locations and optical surface of the lenses may be constrained to ensure that the modeled eyewear would fit and sit at a proper angle for a user. Additionally, certain features may be related due to symmetry or cascading effects; for example, if the computer or user adjusted the width or thickness of one part of the rim, the entire rim on both sides may adjust to ensure a symmetric and attractive appearance. The cascading effects may take into account how symmetry to the frame extends or does not extend to the lenses. For example, two lenses in an eyewear frame may vary based on what each lens corrects. A parametric model 220 may be configured such that the thickness of the frames is adjusted according to the thicker of the two lenses, so that the resulting eyewear remains feeling balanced to the user, even though a frame of a lesser thickness may be sufficient to contain the thinner of the two lenses. Parametric models may be generated and customized using any of the systems and methods described in detail in U.S. Pat. No. 9,304,332, filed Aug. 22, 2014, entitled "Method and System to Create Custom, User-Specific Eyewear," which is incorporated herein by reference in its entirety.

The customized parametric model 220 be generated as a physical product, based on an accurately scaled anatomic model (e.g., model 200). With improper scaling, a physical version of the customized parametric model 220 may have the geometric dimensions customized to a user (e.g., with nose pads that match the contour and angle of a user's nose, or an earpiece matching the contours and different heights of a user's ears), but overall be the wrong size. For example, manufacturing instructions based on 2D scaling could render a physical product too small to be worn by the user. Accordingly, the 3D scaling methods disclosed herein are crucial to transforming a virtual product into real-world dimensions to generate a physical product.

In addition to geometry, the parametric model 220 may include parameters for the surface finish, color, texture, and other cosmetic properties. Parametric model 220 may include or be rendered with a multitude of materials, paints, colors, and surface finishes. Various rendering techniques known to those skilled in the art, such as ray tracing, may be used to render the eyewear and lenses in a photorealistic manner, showing how the eyewear of the parametric model 220 may appear when manufactured. For example, parametric model 220 may be texture mapped with an image to represent the surface or rendered with texture, lighting, and surface properties, including reflectance, transmission, subsurface scattering, surface, or roughness to represent photorealistic appearance of eyewear. Textures used for reflection may be based on generic environment maps, or they may be generated from data captured by an image capture device. Environmental lighting parameters may be extracted from the data captured by the image capture device and used to render the frame and lenses with the same lighting parameters so that the frames and lenses appear more realistic in rendered previews.

The parametric model 220 may further include such lighting and surface properties for lenses of the parametric model 220, based on the lens curvature, thickness, lens material, lens gradation, corrective aspects, etc. Corrective aspects may include whether the lenses are lenses to correct astigmatism, presbyopia, myopia, etc. The lens portion of the parametric model 220 may contain multi-focal lenses, which may include at least two regions of optical correction, e.g., bifocals, trifocals, progressive, or digitally compensated progressives. For instance, the parametric model 220 may further be adapted so that the lens dimensions fit optical corrections and/or preferences of a user. In one scenario, in addition to the lenses of the parametric model 220 modeling bifocal or progressive multifocal lenses, the placement of the various lens powers of the lenses may vary based on the user's preferences and use of the customized eyewear. Like the modifications to the parametric model 220 that account for the user's anatomy, modifications to the parametric model 220 that serve optical purposes may also enable adjustment of at least one parameter, while constraining other parameters. For example, while the positioning of the magnified reading area within the lens shape may be user-specific for the user's preferences and viewing habits, the actual magnification of this lens section and the gradations (if any) between magnified areas may be constrained.

The parametric model 220 may also account for lens characteristics, for example, in a display shown to a user. For example, one embodiment may include displaying the parametric model 220 on a user interface. For instance, a display of the parametric model 220 may include the aesthetic aspects of the eyeglass (frame and lenses), as well as a simulation of the effects of looking through the lenses, e.g., light distortion, or unmagnified distance and magnified reading areas, peripheral distortion (unwanted astigmatism) of a particular progressive lens design and combination of lens/frame parameters, tint (solid, gradient, and photochromatic), edge thickness, the effects of edge lenticularization, etc.

Another exemplary simulation may also include displaying how a user may look to others, while wearing the eyewear of the parametric model 220. For example, if the lenses may cause a user's eyes to look smaller to a person seeing the user, the simulation may show the distortion to the user's eyes. Other optical interaction effects, e.g., shadows and reflections, can be displayed on the eyewear and on a 3D model of the user's face (e.g., as shown in FIG. 2A). The calculated thickness of the users lens can also be rendered, in order to allow the user to determine if a higher index (and therefore thinner and more aesthetically pleasing) lens would be appropriate. The parametric model 220 may include hinge points at the temples to allow the temples to flex with respect to the frame front and fit to a model of the user's face. In another embodiment, the parametric model 220 may also account for an elastic modulus (stretch) in the bulk material property of the frame and/or lens, and this elastic property can be dependent on the frame material or lens material selected.

Figure 3:
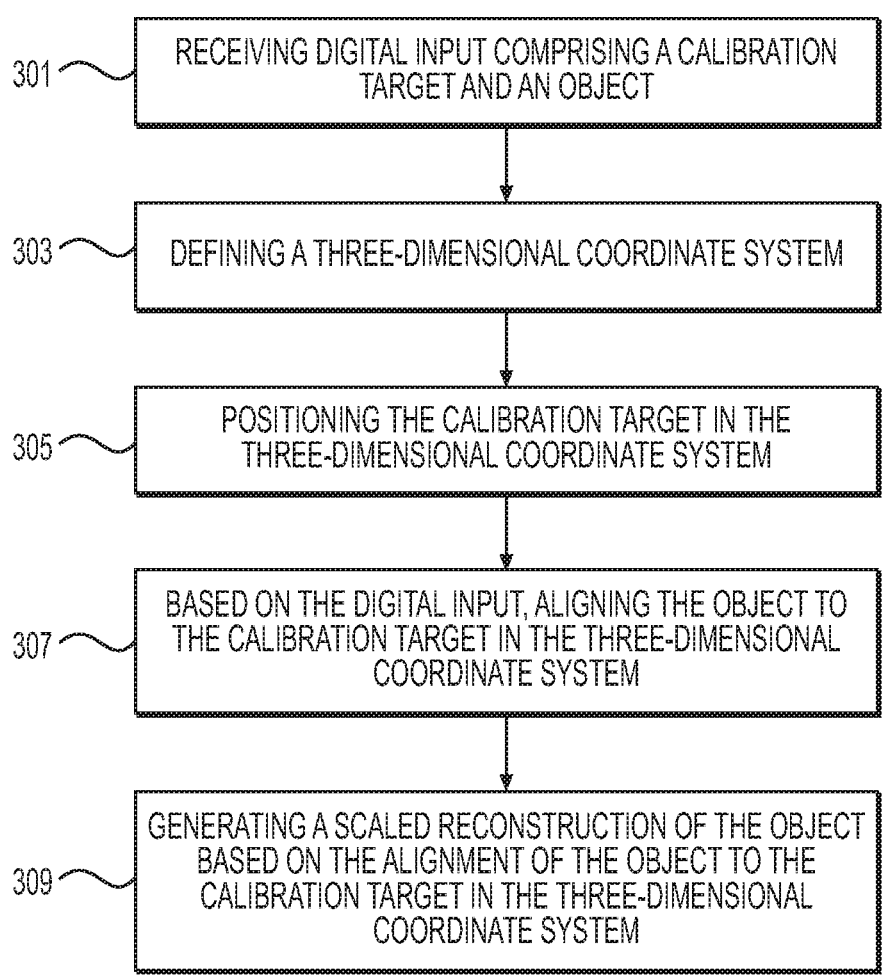
FIG. 3 depicts a flowchart of an exemplary method of generating a reconstruction for an object of unknown size, according to an embodiment of the present disclosure.

FIG. 3 depicts a flowchart of an exemplary method 300 of a general embodiment of generating a reconstruction for an object of unknown size, based on an object of known size (e.g., a calibration target), according to an embodiment of the present disclosure. Method 300 may be performed, for example, by a processor on a mobile device (e.g., assessment platform 101 and/or image capture device 103 of FIG. 1). Method 300 may include interplay between three primary components: digital input, a 3D reconstruction of an object of known size (e.g., a calibration target), and a 3D reconstruction of an object to be measured. Method 300 comprises the steps for scaling of the object of unknown size based on the 3D measurements of the object of known size once both are in the same 3D coordinate system. Digital input may include but is not limited to the following examples: a series of images from a singular image sensor taken from different camera positions, a video taken from different camera positions, a series of images or a video taken from different perspectives with depth information included, a 3D point cloud captured from a depth or 3D sensor, a series of images from multiple 2D sensors, a video captured from multiple 2D sensors, etc.

The object of known size may comprise any object which may have commonly known dimensions, for example, a credit card (and/or the magnetic stripe of a credit card). The calibration target (e.g., a three-dimensional ("3D") reconstruction of the object of known size) may be of known size, scale, and geometry. For example, calibration target comprising a three-dimensional reconstruction of the credit card may be a parameterized three-dimensional reconstruction since it of known size, scale, and 3D geometry. The calibration target may be detected and positioned accurately in 3D space based on the digital input.

The object of unknown size (e.g., a user's face) may be reconstructed in 3D and scaled based on 3D measurements of the calibration target. In one embodiment, the object of unknown size may include a user's face, at least a portion of the user's face, or at least a portion of the user's anatomy. Assessment platform 101 may obtain an anatomic model of a user's anatomy. The anatomic model may include but is not limited to a parametric or shape model, a 3D mesh or point cloud, or a set of points or measurements.

In one embodiment, step 301 may include receiving digital input comprising a calibration target and an object (e.g., of unknown size). Step 303 may include defining a three-dimensional coordinate system. Step 305 may include positioning the calibration target in the three-dimensional coordinate system. One embodiment may include using a 3D model of the object (of unknown scale or size) that has already been generated but is of unknown or improper scale. In this scenario, the 3D model of the object may be aligned to digital input (e.g., input received in step 301) in order to correctly position the object in 3D space relative to the calibration target in 3D space (e.g., as defined by the 3D coordinate system in step 303).

Step 307 may include using the digital input to align the object to the calibration target in the three-dimensional coordinate system. Once both objects are in the same 3D coordinate system, the object of unknown scale can be scaled based on measurements of the calibration target. In particular, each object may be independently reconstructed (or aligned) in 3D space, and in one embodiment, one image from the digital input may be used for the aligning step of step 307. For example, step 307 may include identifying, using the image, the 3D location of the calibration target and the 3D location of the object of unknown size, and detecting the 3D locations with respect to/relative each other at the moment of capture of the image. Step 307 may then include using the relative 3D locations shown by the image to position the calibration target and the object of unknown size in a single 3D coordinate system. In other words, step 307 may include using relative positions shown by received digital input to position the calibration target and the object of unknown size in the same 3D coordinate system. Once the calibration target and the object of unknown size are aligned/positioned in the same 3D coordinate system, step 307 may proceed to measuring the calibration target and the object of unknown size with respect to the other in 3D space and then determining a scaling factor between the calibration target and the object of unknown size. In one embodiment, the image described above may include an image with a short exposure duration so as to freeze any motion in time. If there are a series of images in which it is determined that relative motion is not occurring, all of the images in the series of images can be used to position both in the same 3D space (so as to not introduce error from only one frame or one series of measurements).

Capturing multiple images and then reconstructing in 3D has numerous advantages over capturing a singular image. For example, it may allow for the rejection of images that are blurred, images that have image artifacts, images with unwanted motion, images for which an optimization cannot find agreement as to each image's camera position in 6-degrees of freedom, etc. An optimization can involve agreement between two or more adjacent pairs of images (e.g., pairwise relative constraints), and pairs can be selected by optimizing the acceptable angular displacement in point of view between pairs. Groups of three or more images can be analyzed in pairs such that each image can be assessed against two or more adjacent images, so a singular outlier image can be identified and discarded, ignored, or have its derived camera position refined.

Capturing multiple images can also allow for the assessment, refinement, and rejection of outlier-derived camera positions through analysis of the 3D reconstructed models back-projected on to each 2D image. If the corresponding points on the 3D model deviate in 2D beyond a certain amount in pixels or another linear measurement from the detected 2D points in each image, then it can be assumed that the derived camera position for said 2D image was incorrect and said camera position can be refined or ignored, and the optimization can be performed again including this new information. Various additional constraints in the art and science of computer vision, e.g., epipolar constraints, SIFT or SIFT-like pairwise relative constraints, and SURF, ORB, BRISK, or other learned landmarks may also be used.

Step 309 may include generating a scaled reconstruction of the object based on the alignment of the object to the calibration target in the three-dimensional coordinate system. For example, step 309 may include determining a scaling measurement based on aligning the object to the calibration target in the three-dimensional coordinate system (e.g., from step 307) and generating the scaled reconstruction of the object based on the scaling measurement.

In one embodiment, both objects may include 3D models or reconstructions. For example, method 300 may include determining three-dimensional measurements of the calibration target in the three-dimensional coordinate system; and further generating the scaled reconstruction of the object based on the three-dimensional measurements of the calibration target. Method 300 may also include receiving a three-dimensional reconstruction of the object of unknown size, aligning the calibration target to the three-dimensional reconstruction of the object, and generating the scaled reconstruction based on the alignment of the calibration target to the three-dimensional reconstruction of the object of unknown size. Alternately or in addition, method 300 may include generating the three-dimensional reconstruction of the object of unknown size. For the alignment step, method 300 may include determining, from the digital input, an image including the calibration target and the object. Method 300 may further include determining, from the image, a three-dimensional location of the calibration target and a three-dimensional location of the object. Next, method 300 may include positioning the calibration target in the three-dimensional coordinate system and positioning the object in the three-dimensional coordinate system, based on the three-dimensional location of the calibration target and the three-dimensional location of the object.

Once both 3D objects are reconstructed and aligned in the same coordinate system, measurements of the known object can be used to scale and measure that of the other object. As a next step, the object of unknown scale can be scaled based on 3D measurements of the calibration target. Measuring in 3D may mean that the calibration target need not be in the same Z-plane as the features on the object of unknown size to be measured. Moreover, the calibration target need not be aligned with respect to the object of unknown size.

In one scenario, one way to achieve a scaling measurement is to have the calibration target and the object of unknown size (which can be misaligned with respect to each other), remain stationary during the duration of the digital capture. However, the calibration target and the object of unknown size can have relative motion with respect to each other during the capture when they are simultaneously captured for the digital input. Techniques can be used to determine this relative motion and reduce or eliminate any artifacts this face may introduce during the measurement. (A method for capturing digital input is discussed in more detail at FIGS. 6 and 7.) As long as the calibration target and the object of unknown size themselves do not change shape or size during the capture, they can still move relative to each other during the capture and correct measurements can still be achieved.

Alternatively or in addition to method 300, projected structured light may be used to determine scale with or without a calibration target shown in alongside an object of unknown size. For example, a system may include a device that illuminates an object of unknown size (e.g., a user) by projecting structured light onto the scene. This structured light can be visible or invisible to the user, but it may be visible to one or more imaging sensor(s). The image projected onto the user can be any number of geometric patterns, e.g., dots, a checkerboard, a grid of lines, etc. The imaging sensors can capture images of this projected pattern on the subject and analyze how the pattern distorts as it "wraps" onto the 3D geometry of the object of unknown size (e.g., the user). Such distortion can be used to not only determine 3D depth information, but also scale. For example, if a checkerboard pattern is projected onto an orthogonal plane a set distance from the projector, the observed size of each cell of the checkerboard may increase as the plane's distance from the projector increases. Such a method can be used to determine scale with or without the presence of a calibration target in the scene. The projected image may be the calibration target.

In yet another embodiment or alternative to method 300, scale estimation may be performed without a calibration target (or reference object) in a digital input (e.g., a dedicated scale video). In such a scenario, inertial measurement unit (IMU) sensor motion in a smartphone may be used to estimate scale by reconstructing distance traveled, based on the acceleration of the smartphone (e.g., in/during capturing the video). Error drift due to integration of acceleration at consecutive timestamps may be minimized using local relative constraints that compel IMU observations to be consistent for local (spatio-temporally nearby) pairs of camera poses. In particular, multiple pairs of consecutive poses may be used to constrain the translation and rotation estimate of the smartphone and minimize the drift in the smartphone's IMU readings due to Gaussian white noise. In one embodiment, an exemplary method may include (assessment platform 101) integrating an IMU sensor with camera measurements by synchronizing IMU sensor data with camera data. The relative transformation between an IMU reference frame and camera reference frame may be computed for each smartphone device (e.g., image capture device 103). This method may include assuming the relative transformation to be fixed for a specific model of the smartphone.

Consistent errors due to IMU bias may be estimated via an optimization algorithm. The optimization algorithm, while solving for a constant scale parameter for the camera position, may also infer IMU bias and correct misalignment between the timestamped sensor data and the camera images. Pairwise relative translation and rotation constraints between consecutive (or spatio-temporally nearby) images in a video may be used to enforce fixed scale translation estimated from IMU. This translation and rotation optimized over large number of pair of camera poses may settle to provide a mean scale assuming Gaussian white noise in the digital input, and e.g., a fixed IMU bias. A scale estimated using this approach may be accurate within the range of accuracy for hand-measured $P_d$ measurements. For example, a scale estimated using this approach may be accurate within the range of accuracy for permissible errors required for traditional/optician-measured $P_d$ measurements.

Figure 4:
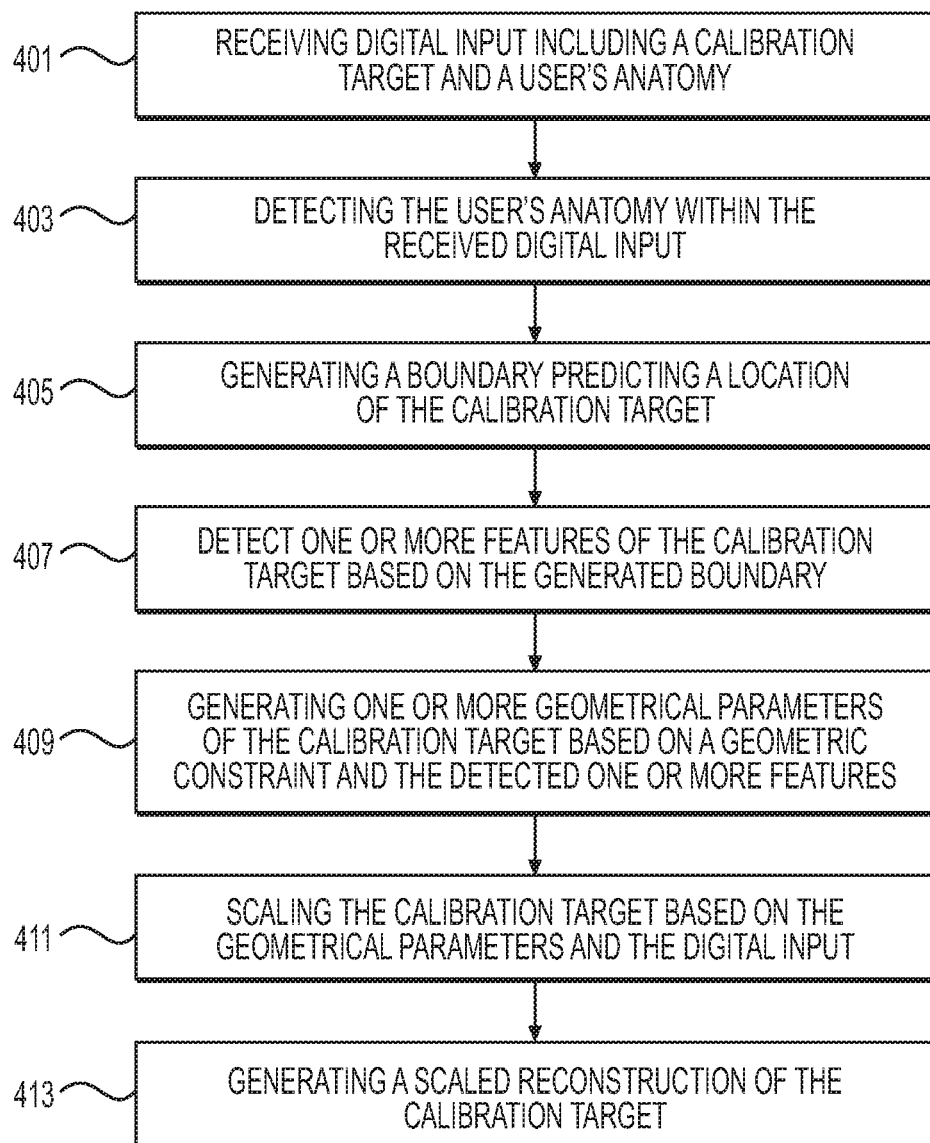
FIG. 4 depicts a flowchart of an exemplary method of generating a scaled reconstruction of a calibration target (in preparation for generating the scaled reconstruction of the object of unknown size), according to an embodiment of the present disclosure.

FIG. 4 depicts a flowchart of an exemplary method 400 of generating a scaled reconstruction of a calibration target (in preparation for generating the scaled reconstruction of the object of unknown size), according to an embodiment of the present disclosure. In one embodiment, step 401 may include receiving and/or generating digital input including a calibration target and an object of unknown size (e.g., a portion of a user's anatomy). In one embodiment, step 403 may include detecting the object of unknown size within the digital input. Steps 405-409 may include detecting the calibration target in one or more images of the digital input. In one embodiment, the step of detecting the calibration target may be performed by a detector specifically trained to detect the calibration target in one or more images.

In one embodiment, step 405 may include generating a boundary (e.g., a bounding box) of where the calibration target is expected to be. For example, the boundary may be located at a predicted location of at least a portion of the calibration target. The boundary can vastly reduce the area needing to be searched for detection of the calibration target. In this way, the boundary may not only improve detection speed, but also accuracy, as any features outside this boundary may be ignored. Otherwise, image features outside the boundary could confuse a calibration target detection algorithm.

The predicted location of the calibration target may be determined based on the detected location of the object of unknown size. The predicted location may further be based on an estimated pose, e.g., a position of the object of unknown size and position of the calibration target relative to the object of unknown size. For example, if a calibration target comprises a credit card and an object of unknown size comprises a user's face, a pose may entail the credit card being positioned at a specified location relative to the user's face, e.g., placing the credit card next to a user's chin. In this way, calibration target detection can leverage the estimated pose of the calibration target based on the estimated pose of the face. This can further improve speed and accuracy. For example, if a credit card (calibration target) were positioned orthogonal to the face, against the front surface of the chin, and centered horizontally with respect to the face, and the image was taken at the 30° angle off-axis from the face, the face can first be accurately detected and the pose estimated. In other words, the estimated pose of the card in such a scenario may be assumed to be 30° off-axis and the correct or best detector (or settings for said detector) for this camera position. As such, pose detection may be leveraged to achieve the fastest and highest-accuracy detection of the corners of said credit card calibration target and its magnetic stripe. In addition, the present method permits generation of a scaled reconstruction even if the calibration target (or reference object) moves or is flexible during a digital input, as long as the calibration target is within the expected post (e.g., touching the user's chin or some part of the face). Unlike prior scaling methods, the disclosed methods are robust and stable to movement of the calibration target because they use 3D digital alignment and relative dimensions of calibration target to the object of unknown size.

Methods to better detect and process credit card calibration targets are described herein. Depending on how a user holds the card, one or more corners of the card may be obstructed/occluded from the view of the imaging apparatus. Thus, the disclosed embodiments may employ detection algorithms tolerant of occlusion. Detection of the card can start with a bounding box, which can be its own detector or can start with an estimated bounding box based on face pose estimation (as previously disclosed). This bounding box can look for the whole card, or portions of the card; e.g., a bounding box unique to each corner of the card or combination thereof, as well as each corner of the magnetic stripe or combination thereof. The individual bounding boxes can be refined or constrained based on implicit geometry constraints because the geometry of the card (or geometry of any other calibration target used) may be known ahead of time. Step 407 may include detecting one or more features of the calibration target based on the generated box. For example, step 407 may include feature detection of the corner(s) of the card and/or corner(s) of a magnetic stripe of a calibration target comprising a credit card. In some embodiments, step 407 may be the first step of method 400, if method 400 does not employ usage of a bounding box. Although this embodiment describes using a bounding box, any boundary or perimeter may be used.

Implicit geometry constraints may be used to help with initial detection or refine each initial detection. Image patches that are analyzed can be scaled up or down based on image resolution so they can be executed at the same resolution that they were trained (or inversely, the image can be scaled up or down to match the training resolution). Further refinements to the detected landmarks (or corner(s)) of the calibration target can be performed via image processing techniques, e.g., circle and line detection (Hough transform, image gradients, etc.). If an image was downsampled in order to match a training dataset's resolution, an original full resolution image can be used for image processing to leverage the advantage of additional pixels without downsampling artifacts. The length and width of the boundaries or bounding box(es) for image processing can also be scaled based on resolution so the same approximate size in real world measurements (e.g., millimeters) can be analyzed regardless of pixel resolution. Therefore, a higher resolution image may have a larger bounding box than the same image that was down-sampled to a lower resolution.

In one embodiment, step 409 may include generating one or more geometrical parameters of the calibration target based on a geometric constraint and one or more detected features. In the example of a card, vertical lines can be detected for the vertical edges of the card, and horizontal lines can be detected not only for the top and bottom edges of the card, but also the top and bottom edges of the magnetic stripe. Furthermore, geometry constraints on the line detection can also be applied to aid in the line detection and refinement optimization. For example, most magnetic stripes are towards the top of a card, so in one embodiment of line detection, three horizontal lines should all be detected in an expected area. Further, since the card is a plane, the three lines should all be parallel with respect to this plane. Yet another scaling measurement of a credit card may include using the width of the magnetic stripe due to its high-contrast edges and corners and the ability for a user to hold a card without occluding the stripe. The corners and edges of the card can also be used in the scale calculation exclusively (without the stripe), in part, or simply as a means to aid in the refinement of the stripe detection (geometry constraints). Cards with magnetic stripes can have different widths and positions of their magnetic stripe. The type of magnetic stripe on the card used can be automatically recognized and the best card and stipe corner detectors (and geometry constraints) can be selected and utilized. In one embodiment, data collection method 600 of FIG. 6 may include selecting and defining a card to use for the calibration target. The selection may be based on the ease in detecting the features of the card. Data collection method 600 may further include defining a pose for the calibration target relative to the object of unknown size, e.g., prompting the command, "please position the card orthogonal to the face and do not obstruct the magnetic strip."

In one embodiment, step 411 may include scaling the calibration target based on the generated geometrical parameters and the digital input. Step 413 may include generating a scaled reconstruction of the calibration target. The object of unknown size may then be scaled and reconstructed based on the scaled reconstruction of the calibration target.

Figure 5:
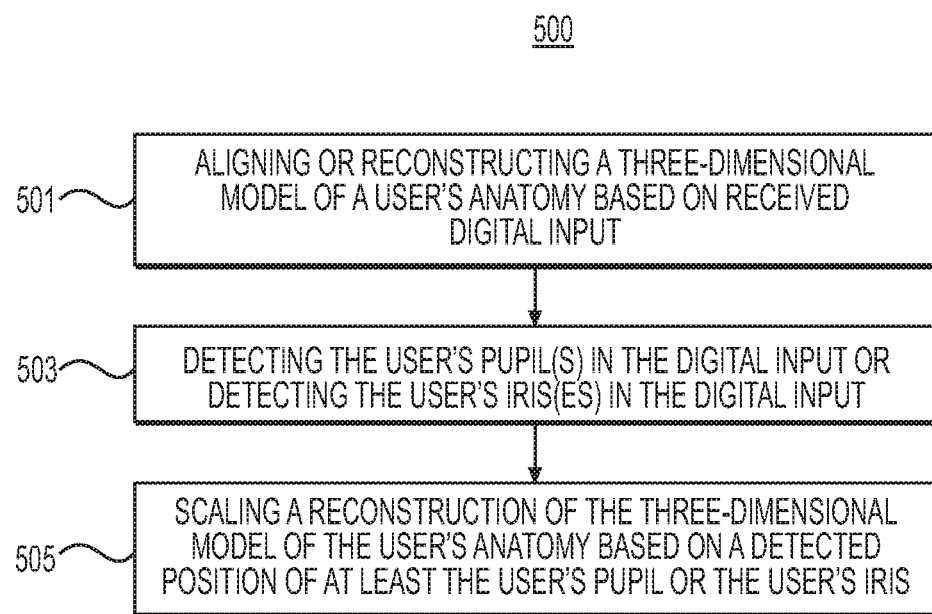
FIG. 5 depicts a flowchart of an exemplary method of generating a scaled reconstruction of the object of unknown size), according to an embodiment of the present disclosure.

FIG. 5 depicts a flowchart of a particular method 500 of generating a scaled reconstruction of the object of unknown size), according to an embodiment of the present disclosure. In general, detection of landmarks on the object of unknown size (e.g., a face) can leverage the upscaling/downsampling techniques described above. Alternately or in addition (in the exemplary embodiment of a face being the object of unknown size), detection of the face can leverage a face detection model trained using a selfie video/series of images or dataset one without the calibration target present, using a different model that was re-trained on the same video/series of images or dataset or different groundtruth dataset, or using a different model that was re-trained on the same video/series of images or dataset or different groundtruth dataset without the use of one or more landmarks that would be occluded by the presence of a calibration target. For example, if a credit card is used as a calibration target, and the user is instructed to hold it against their chin while a video or series of images is captured, then the chin as a landmark would be occluded. Therefore, the model used for face detection in the presence of a card can use a model which was trained without the detection of the chin landmark.

Detection of face landmark(s) in the calibration dataset (e.g., series of images, video, or other sensor input from depth sensors, multi-camera, structured light, accelerometer(s), gyroscope(s)) in the presence of the calibration target can be used to scale the face with respect to the calibration target. In the example of a face being scaled via a credit card, once the measurement in 3D space of the credit card is complete (whether using the magnetic stripe alone, or in conjunction with the width and height of the card itself), the 3D face model (either reconstructed from the calibration dataset or an existing 3D model from a previous capture that is aligned to this dataset) can be scaled. Scaling can occur uniformly in all three dimensions, or can scale differently in each dimension.

In addition to scaling a 3D face model relative to the calibration target, a 3D model may further be scaled relative to the position of detected and aligned face landmarks, e.g., a user's pupils, irises, any other facial features or dimensions, or a combination thereof. Pupil detection in digital input (e.g., a video/series of images for scaling in the presence of a calibration target) can also be used to measure and scale both distance and near pupillary distance using the methods described herein.

In one embodiment where an object of unknown size may include a user's face, the face can be scaled via a 3D measurement of the distance between the pupils. In one embodiment, step 501 may include receiving digital input and step 503 may include detecting a user's pupil(s) in the digital input. A user's pupils can move around and change focus during capture, which can render their determined position in 3D space inaccurate. In one embodiment, step 501 may further include aligning a 3D face model (or building the 3D face model) from the series of images (e.g., from digital input). Steps 503 and 505 may then include scaling the 3D face model via pupil (positions) detected in one image. If the exposure duration for the image is kept very short, then even if the pupils are moving, they will be frozen in place in each image captured (with little to no motion blur). Alternately or in addition, step 503 may include detecting one or more points around the user's eye opening and step 505 may include scaling the 3D face model based on those points. In this way, eye movement within each eye socket may be immaterial to the scaling method (as eye movement will not affect landmarks detected outside and around the eye). Alternately or in addition, step 503 may include detecting or generating numerous points (e.g., 4-50 points) evenly or pre-determinedly spaced around the border of each eye opening. Step 503 may further include averaging the points in a two-dimensional ("2D") or 3D space in order to achieve a "virtual pupil" which may be intolerant to eye movement. The distance between a subject's virtual pupil can be used for the purposes of scaling a face model. Method 500 may also be performed with scaling based on iris position, in place of pupil position. Alternately or in addition, landmarks not at all related to the eyes may be used, such as those relating to the nose or ears. Any other combination of detected and aligned face landmarks can be used. Using a combination of anatomical landmarks in scaling may provide an advantage over using pupil detection alone FIG. 6 depicts a flowchart of an exemplary method 600 of generating or capturing digital input to construct a scaled reconstruction, according to an embodiment of the present disclosure. Generating the digital input may include collecting the digital input, e.g., using an image capture device including a camera. The image capture device/camera include a mobile device. In general, building a 3D model of a scene from multiple 2D images of differing vantage points (e.g., camera positions) may involve movement of the camera(s) relative to a stationary scene, the movement of the object(s) relative to a stationary camera(s), or the simultaneous movement of both. Each approach has its advantages and disadvantages, and method 600 merely serves as one possible method for capturing digital input in preparation for creating a scaled model.

In one embodiment, step 601 may include prompting a user to remain stationary and move an image capture device to generate digital input. Step 603 may include prompting the user to use a rear camera of the image capture device. Step 605 may include prompting the user or image capture device to use flash at a certain exposure. Step 607 may include initiating capture of digital input using the rear camera, flash, and first, short duration exposures of the image capture device. The digital input may be reviewed for image quality or compared to an image quality threshold for sufficient image quality to produce a scaled reconstruction. Step 609 may then include prompting a second capture of digital input at an adjusted exposure that is updated from the first, short exposure duration based on the review of image quality.

FIG. 7 includes a visual depiction of capturing digital input (e.g., as dictated by assessment platform 101), according to an embodiment of the present disclosure. In one embodiment, user 701 may be prompted to perform capture 703. Digital input may be captured according to certain instructions and orientations 705 in response to cues or prompts. Cues or prompts may be displayed on a screen or communicated via audio, vibration, haptic response, flash, or other visual indicators, either on an image capture device 707, or another device, e.g., a watch. In one embodiment, image capture device 707 may be a mobile device. The cues or prompts may be executed based on a pre-set timing (for a series of directions), face/feature detection and pose estimation, accelerometer data, gyroscope data, detected audio/audio response (from the user), etc.

In another embodiment, all the methods and techniques described herein are applied to the customization, rendering, display, and manufacture of custom eyewear cases. A user could select from a plurality of materials, colors, designs, shapes, and features and see an accurate rendering of the case on his display. Moreover, the case can automatically be sized to fit the custom eyewear designed such that the case securely contains the eyewear. For example, the case can be automatically designed to custom fit the eyewear such that it minimizes the size of the case and increases the case's ability to protect the eyewear in transport. The case color, style, and materials, and method of manufacture can also be matched to those used to make the custom eyewear. Custom text, e.g., the name of the user, may be engraved or marked on or in the case. The same eyewear manufacturing techniques described herein may also be used to manufacture the custom cases.

Those skilled in the art will recognize that the systems and methods described herein may also be used in the customization, rendering, display, and manufacture of other custom products. Since the technology described applies to the use of custom image data, anatomic models, and product models that are built for customization, a multitude of other products is designed in a similar way, for example: custom jewelry (e.g. bracelets, necklaces, earrings, rings, nose-rings, nose studs, tongue rings/studs, etc.), custom watches (e.g., watch faces, bands, etc.), custom cufflinks, custom bow ties and regular ties, custom tie clips, custom hats, custom bras, Inserts (pads), and other undergarments, custom swimsuits, custom clothing (jackets, pants, shirts, dresses, etc.), custom baby bottle tips and pacifiers (based on scan and reproduction of mother's anatomy), custom prosthetics, custom helmets (motorcycle, bicycle, ski, snowboard, racing, F1, etc.), custom earplugs (active or passive hearing protection), custom audio earphone (e.g., headphone) tips (over-the-ear and in-ear), custom Bluetooth headset tips (over-the-ear or in-ear), custom safety goggles or masks, and custom head-mounted displays.

It would also be apparent to one of skill in the relevant art that the present disclosure, as described herein, can be implemented in many different embodiments of software, hardware, firmware, and/or the entities illustrated in the figures. The operational behavior of embodiments may be described with the understanding that modifications and variations of the embodiments are possible, given the level of detail presented herein. It is to be understood that both the foregoing general description and the following detailed description are exemplary and explanatory only and are not restrictive of the disclosed embodiments, as claimed.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for generating a scaled reconstruction of an object relative to an individual's anatomy, using a computer system, the method comprising:

receiving, from an image capture device, a first digital input comprising a digital representation of a calibration target and an object and/or individual's anatomy proximate to the calibration target;

defining a three-dimensional coordinate system representing a three-dimensional space for scaling the object using the calibration target;

positioning the object in the three-dimensional coordinate system;

positioning the calibration target in the three-dimensional coordinate system;

aligning the object to the calibration target in the three-dimensional coordinate system based on the first digital input;

generating a scaled reconstruction of the object based on the alignment of the object to the calibration target in the three-dimensional coordinate system based on the first digital input;

receiving, from a depth sensor, a second digital input comprising depth information of the object and/or the individual's anatomy; and generating a digital representation of the scaled reconstruction of the object overlaid on the individual's anatomy based on the first digital input and the second digital input comprising the depth information of the object and/or the individual's anatomy based on the second digital input received from the depth sensor.

2. The method of claim 1, further comprising:
determining three-dimensional measurements of the calibration target in the three-dimensional coordinate system; and
further generating the scaled reconstruction of the object based on the three-dimensional measurements of the calibration target.

3. The method of claim 1, wherein the calibration target is comprised of a parameterized three-dimensional reconstruction.

4. The method of claim 1, further comprising:
receiving a three-dimensional reconstruction of the object;
aligning the calibration target to the three-dimensional reconstruction of the object; and
generating the scaled reconstruction based on the alignment of the calibration target to the three-dimensional reconstruction of the object.

5. The method of claim 4, further comprising:
generating the three-dimensional reconstruction of the object.

6. The method of claim 1, further comprising:
determining, from the first digital input, an image including the calibration target and the object and/or the individual's anatomy;
determining, from the image, a three-dimensional location of the calibration target and a three-dimensional location of the object; and
positioning the calibration target in the three-dimensional coordinate system and positioning the object in the three-dimensional coordinate system, based on the three-dimensional location of the calibration target and the three-dimensional location of the object.

7. The method of claim 1, further comprising:
determining a scaling measurement based on aligning the object to the calibration target in the three-dimensional coordinate system; and
generating the scaled reconstruction of the object based on the scaling measurement.

8. The method of claim 1, wherein the first digital input includes one or more of a series of images from a singular image sensor taken from different camera positions, a video taken from different camera positions, a series of images or a video taken from different perspectives with depth information included, a 3D point cloud captured from a depth or 3D sensor, a series of images from multiple 2D sensors, a video captured from multiple 2D sensors, or a combination thereof.

9. A system for generating a scaled reconstruction of an object relative to an individual's anatomy, the system comprising:
a data storage device storing instructions for generating a scaled reconstruction for a consumer product; and
a processor configured to execute the instructions to perform a method including:
receiving, from an image capture device, a first digital input comprising a digital representation of a calibration target and an object and/or individual's anatomy proximate to the calibration target;
defining a three-dimensional coordinate system representing a three-dimensional space for scaling the object using the calibration target;
positioning the object in the three-dimensional coordinate system;
positioning the calibration target in the three-dimensional coordinate system;
aligning the object to the calibration target in the three-dimensional coordinate system based on the first digital input;
generating a scaled reconstruction of the object based on the alignment of the object to the calibration target in the three-dimensional coordinate system based on the first digital input;
receiving, from a depth sensor, a second digital input comprising depth information of the object and/or the individual's anatomy; and
generating a digital representation of the scaled reconstruction of the object overlaid on the individual's anatomy based on the first digital input and the second digital input comprising the depth information of the object and/or the individual's anatomy based on the second digital input received from the depth sensor.

10. The system of claim 9, wherein the system is further configured for:
determining three-dimensional measurements of the calibration target in the three-dimensional coordinate system; and
further generating the scaled reconstruction of the object based on the three-dimensional measurements of the calibration target.

11. The system of claim 9, wherein the calibration target is comprised of a parameterized three-dimensional reconstruction.

12. The system of claim 11, wherein the system is further configured for:
receiving a three-dimensional reconstruction of the object;
aligning the calibration target to the three-dimensional reconstruction of the object; and
generating the scaled reconstruction based on the alignment of the calibration target to the three-dimensional reconstruction of the object.

13. The system of claim 12, wherein the system is further configured for:
generating the three-dimensional reconstruction of the object.

14. The system of claim 9, wherein the system is further configured for:
determining, from the first digital input, an image including the calibration target and the object and/or the individual's anatomy;
determining, from the image, a three-dimensional location of the calibration target and a three-dimensional location of the object; and
positioning the calibration target in the three-dimensional coordinate system and positioning the object in the three-dimensional coordinate system, based on the three-dimensional location of the calibration target and the three-dimensional location of the object.

15. The system of claim 9, wherein the system is further configured for:
determining a scaling measurement based on aligning the object to the calibration target in the three-dimensional coordinate system; and
generating the scaled reconstruction of the object based on the scaling measurement.

16. The system of claim 9, wherein the first digital input includes one or more of a series of images from a singular image sensor taken from different camera positions, a video taken from different camera positions, a series of images or a video taken from different perspectives with depth information included, a 3D point cloud captured from a depth or 3D sensor, a series of images from multiple 2D sensors, a video captured from multiple 2D sensors, or a combination thereof.

17. A non-transitory computer readable medium for use on a computer system containing computer-executable programming instructions for generating a scaled reconstruction of an object relative to an individual's anatomy, the method comprising:
   receiving, from an image capture device, a first digital input comprising a digital representation of a calibration target and an object and/or individual's anatomy proximate to the calibration target;
   defining a three-dimensional coordinate system representing a three-dimensional space for scaling the object using the calibration target;
   positioning the object in the three-dimensional coordinate system;
   positioning the calibration target in the three-dimensional coordinate system;
   aligning the object to the calibration target in the three-dimensional coordinate system based on the first digital input;
   generating a scaled reconstruction of the object based on the alignment of the object to the calibration target in the three-dimensional coordinate system based on the first digital input;
   receiving, from a depth sensor, a second digital input comprising depth information of the object and/or the individual's anatomy; and
   generating a digital representation of the scaled reconstruction of the object overlaid on the individual's anatomy based on the first digital input and the second digital input comprising the depth information of the object and/or the individual's anatomy based on the second digital input received from the depth sensor.

18. The non-transitory computer readable medium of claim 17, the method further comprising:
   determining three-dimensional measurements of the calibration target in the three-dimensional coordinate system; and
   further generating the scaled reconstruction of the object based on the three-dimensional measurements of the calibration target.

19. The non-transitory computer readable medium of claim 17, wherein the calibration target is comprised of a parameterized three-dimensional reconstruction.

20. The non-transitory computer readable medium of claim 17, wherein the first digital input includes one or more of a series of images from a singular image sensor taken from different camera positions, a video taken from different camera positions, a series of images or a video taken from different perspectives with depth information included, a 3D point cloud captured from a depth or 3D sensor, a series of images from multiple 2D sensors, a video captured from multiple 2D sensors, or a combination thereof.

* * * * *